United States Patent
Lee et al.

(10) Patent No.: US 11,950,203 B2
(45) Date of Patent: Apr. 2, 2024

(54) METHODS OF PAGING PROCEDURES FOR REDUCED BANDWIDTH WTRUS

(71) Applicant: InterDigital Patent Holdings, Inc., Wilmington, DE (US)

(72) Inventors: Moon-il Lee, Melville, NY (US); Janet A. Stern-Berkowitz, Little Neck, NY (US); Jaehyun Ahn, Seoul (KR); Pascal M. Adjakple, Great Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 364 days.

(21) Appl. No.: 17/401,987

(22) Filed: Aug. 13, 2021

(65) Prior Publication Data
US 2021/0385787 A1    Dec. 9, 2021

Related U.S. Application Data

(63) Continuation of application No. 15/772,446, filed as application No. PCT/US2016/060554 on Nov. 4, 2016, now Pat. No. 11,096,143.

(Continued)

(51) Int. Cl.
*H04W 74/04* (2009.01)
*H04L 5/00* (2006.01)
(Continued)

(52) U.S. Cl.
CPC ......... *H04W 68/005* (2013.01); *H04L 5/0007* (2013.01); *H04L 5/0053* (2013.01);
(Continued)

(58) Field of Classification Search
CPC ...... H04L 5/0007; H04L 5/0053; H04W 4/70; H04W 68/005; H04W 68/025; H04W 72/23; H04W 76/27; H04W 76/28
See application file for complete search history.

(56) References Cited

U.S. PATENT DOCUMENTS

| 8,743,787 B2 | 6/2014 | Bostrom et al. |
| 9,095,000 B2 | 7/2015 | Oh et al. |

(Continued)

FOREIGN PATENT DOCUMENTS

| CN | 102781094 | 11/2012 |
| KR | 20120124042 A | 11/2012 |

(Continued)

OTHER PUBLICATIONS

Dahlman et al., *4G LTE/LTE-Advanced for Mobile Broadband*, 2nd edition, Elsevier Press, ISBN: 978-0-12-419985-9, sections 10.4.3-10.4.5, pp. 207-223 (2014).

(Continued)

*Primary Examiner* — Phuc H Tran
(74) *Attorney, Agent, or Firm* — VOLPE KOENIG

(57) ABSTRACT

A wireless transmit/receive unit (WTRU) may receive a physical downlink control channel (PDCCH) transmission in a WTRU-specific search space, with the PDCCH transmission including a sequence scrambled based on a first radio network temporary identifier (RNTI), the first RNTI associated with the WTRU, and the sequence including downlink control information (DCI) and a cyclic redundancy check (CRC). The WTRU may determine scheduling information for a physical downlink shared channel (PDSCH) transmission based on the DCI. Further, the WTRU may receive the PDSCH based on the scrambling information. Additionally, the first RNTI may be a WTRU-identifier (WTRU-ID). Also, the DCI and CRC may be scrambled by a second RNTI. Moreover, the WTRU may receive scrambling indication information indicating that scrambling of information in a PDCCH transmission by an RNTI may be used. Also, the PDCCH transmission may include the sequence on a condition that the scrambling indication information is received.

20 Claims, 10 Drawing Sheets

Related U.S. Application Data

(60) Provisional application No. 62/308,042, filed on Mar. 14, 2016, provisional application No. 62/290,790, filed on Feb. 3, 2016, provisional application No. 62/250,803, filed on Nov. 4, 2015.

(51) Int. Cl.
*H04W 4/70* (2018.01)
*H04W 68/00* (2009.01)
*H04W 68/02* (2009.01)
*H04W 72/23* (2023.01)
*H04W 76/28* (2018.01)
*H04W 76/27* (2018.01)

(52) U.S. Cl.
CPC ........... *H04W 4/70* (2018.02); *H04W 68/025* (2013.01); *H04W 72/23* (2023.01); *H04W 76/28* (2018.02); *H04W 76/27* (2018.02)

(56) References Cited

U.S. PATENT DOCUMENTS

| | | | |
|---|---|---|---|
| 9,648,657 | B2 | 5/2017 | Pelletier et al. |
| 10,244,508 | B2* | 3/2019 | Kim ..................... H04W 72/04 |
| 2010/0222083 | A1 | 9/2010 | Kazmi et al. |
| 2011/0310854 | A1 | 12/2011 | Zou et al. |
| 2013/0083753 | A1 | 4/2013 | Lee et al. |
| 2013/0194931 | A1 | 8/2013 | Lee et al. |
| 2014/0086200 | A1 | 3/2014 | Seok |
| 2014/0105164 | A1* | 4/2014 | Moulsley ................. H04W 4/70 370/329 |
| 2014/0126409 | A1 | 5/2014 | Ahn et al. |
| 2014/0198742 | A1 | 7/2014 | Baldemair et al. |
| 2015/0146692 | A1 | 5/2015 | Yi et al. |
| 2015/0264718 | A1 | 9/2015 | Yu et al. |
| 2016/0029434 | A1 | 1/2016 | Qiu et al. |
| 2016/0105860 | A1 | 4/2016 | Li et al. |
| 2016/0127097 | A1 | 5/2016 | Chen et al. |
| 2016/0227513 | A1 | 8/2016 | Vajapeyam et al. |
| 2016/0242170 | A1 | 8/2016 | Xu et al. |
| 2016/0338006 | A1 | 11/2016 | Lee et al. |
| 2018/0070376 | A1 | 3/2018 | Zhang et al. |
| 2018/0212736 | A1 | 7/2018 | Chatterjee et al. |

FOREIGN PATENT DOCUMENTS

| | | |
|---|---|---|
| WO | 2011/100497 | 8/2011 |
| WO | 2013/082784 | 6/2013 |
| WO | 2014/069946 | 5/2014 |

OTHER PUBLICATIONS

Dahlman et al., *4G LTE-Advanced Pro and the Road to 5G*, 3rd edition, Elsevier Press, ISBN: 978-0-12-084575-6, sections 6.4.3-6.4.5, pp. 138-153 (2016).
Huawei et al., "Considerations on supporting efficient paging transmission for MTC UEs," 3GPP TSG RAN WG1 Meeting #82bis, R1-155106, Malmö, Sweden (Oct. 5-9, 2015).
Intel Corporation, "Remaining details on paging enhancements for MTC," 3GPP TSG RAN WG1 Meeting #82bis, R1-155304, Malmö, Sweden (Oct. 5-9, 2015).
Interdigital, "On Timing and Frequency Relationship for MTC-SIB1 and Paging," 3GPP TSG RAN WG1 Meeting #83, R1-157433, Anaheim, California, USA (Nov. 15-22, 2015).
Interdigital, "Paging for NB-IoT," 3GPP TSG RAN WG1 Meeting #84, R1-160921, St Julian's, Malta (Feb. 15-19, 2016).
Interdigital, "Paging for NB-IoT," 3GPP TSG RAN WG1 NB-IoT Ad-Hoc Meeting, R1-160137, Budapest, Hungary (Jan. 18-20, 2016).
Interdigital, "Paging for NB-IoT," 3GPP TSG RAN WG1 NB-IoT Ad-Hoc Meeting, R1-161916, Sophia Antipolis, France (Mar. 22-24, 2016).
Nokia Networks, "Paging Transmission for MTC," 3GPP TSG-RAN WG1 Meeting #82bis, R1-155146, Malmö, Sweden (Oct. 5-9, 2015).
Sesia et al., *LTE—The UMTS Long Term Evolution: From Theory to Practice*, 2nd edition, John Wiley & Sons, Ltd., ISBN: 978-0-470-66025-6 (2011).
Third Generation Partnership Project, "Technical Specification Group Radio Access Network; Evolved Universal Terrestrial Radio Access (E-UTRA); Physical channels and modulation (Release 12)," 3GPP TS 36.211 V12.7.0 (Sep. 2015).
Third Generation Partnership Project, "Technical Specification Group Radio Access Network; Evolved Universal Terrestrial Radio Access (E-UTRA); Physical channels and modulation (Release 12)," 3GPP TS 36.211 V12.8.0 (Dec. 2015).
Third Generation Partnership Project, "Technical Specification Group Radio Access Network; Evolved Universal Terrestrial Radio Access (E-UTRA); Physical channels and modulation (Release 13)," 3GPP TS 36.211 V13.3.0 (Sep. 2016).
Third Generation Partnership Project, "Technical Specification Group Radio Access Network; Evolved Universal Terrestrial Radio Access (E-UTRA); Physical channels and modulation (Release 14)," 3GPP TS 36.211 V14.0.0 (Sep. 2016).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.6.0 (Sep. 2015).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.8.0 (Mar. 2016).
Third Generation Partnership Project, "Technical Specification Group Radio Access Network; Evolved Universal Terrestrial Radio Access (E-UTRA); Multiplexing and channel coding (Release 13)," 3GPP TS 36.212 V13.3.0 (Sep. 2016).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.0.0 (Sep. 2016).
Third Generation Partnership Project, "Technical Specification Group Radio Access Network; Evolved Universal Terrestrial Radio Access (E-UTRA); Physical layer procedures (Release 12)," 3GPP TS 36.213 V12.7.0 (Sep. 2015).
Third Generation Partnership Project, "Technical Specification Group Radio Access Network; Evolved Universal Terrestrial Radio Access (E-UTRA); Physical layer procedures (Release 12)," 3GPP TS 36.213 V12.11.0 (Sep. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.3.0 (Sep. 2016).
Third Generation Partnership Project, "Technical Specification Group Radio Access Network; Evolved Universal Terrestrial Radio Access (E-UTRA); Physical layer procedures (Release 14)," 3GPP TS 36.213 V14.0.0 (Sep. 2016).
Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.7.0 (Sep. 2015).
Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.9.0 (Mar. 2016).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.7.0 (Sep. 2015).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.0.0 (Sep. 2016).

(56) References Cited

OTHER PUBLICATIONS

Third Generation Partnership Project, "Technical Specification Group Radio Access Network; Evolved Universal Terrestrial Radio Access (E-UTRA); User Equipment (UE) procedures in idle mode (Release 12)," 3GPP TS 36.304 V12.6.0 (Sep. 2015).
Third Generation Partnership Project, "Technical Specification Group Radio Access Network; Evolved Universal Terrestrial Radio Access (E-UTRA); User Equipment (UE) procedures in idle mode (Release 12)," 3GPP TS 36.304 V12.8.0 (Jun. 2016).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.3.0 (Sep. 2016).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.0.0 (Sep. 2016).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.3.0 (Sep. 2016).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.11.0 (Sep. 2016).
Third Generation Partnership Project, "Technical Specification Group Radio Access Network; Evolved Universal Terrestrial Radio Access (E-UTRA); User Equipment (UE) procedures in idle mode (Release 14)," 3GPP TS 36.304 V14.0.0 (Sep. 2016).
Third Generation Partnership Project, "Technical Specification Group Radio Access Network; Evolved Universal Terrestrial Radio Access (E-UTRA); User Equipment (UE) procedures in idle mode (Release 13)," 3GPP TS 36.304 V13.3.0 (Sep. 2016).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.1.0 (Sep. 2015).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.5.0 (Sep. 2016).
Third Generation Partnership Project, "Technical Specification Group Radio Access Network; Evolved Universal Terrestrial Radio Access (E-UTRA) and Evolved Universal Terrestrial Radio Access etwork (E-UTRAN); Overall description; Stage 2 (Release 14)," 3GPP TS 36.300 V14.0.0 (Sep. 2016).
Third Generation Partnership Project, "Technical Specification Group Radio Access Network; Multiplexing and channel coding (FDD) (Release 5)," 3GPP TS 25.212 V5.10.0 (Jun. 2005).
Third Generation Partnership Project, "Technical Specification Group Radio Access Network; Multiplexing and channel coding (FDD) (Release 13)," 3GPP TS 25.212 V13.0.0 (Sep. 2015).
Third Generation Partnership Project, "Technical Specification Group Radio Access Network; Multiplexing and channel coding (FDD) (Release 13)," 3GPP TS 25.212 V13.1.0 (Jun. 2016).
ZTE, "Considerations on common control messages for MTC enhancement," 3GPP TSG RAN WG1 Meeting #78bis, R1-143809, Ljubljana, Slovenia (Oct. 6-10, 2014).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.9.0 (Sep. 2015).
Third Generation Partnership Project, "Technical Specification Group Radio Access Network; Evolved Universal Terrestrial Radio Access (E-UTRA); Physical layer procedures (Release 12)," 3GPP TS 36.213 V12.4.0 (Dec. 2014).
Interdigital, "System Information Change and Paging Mechanisms," 3GPP TSG-RAN WG2 #93, R2-161649, St. Julian's, Malta (Feb. 15-19, 2016).
Interdigital et al., "WF on Paging for eMTC and UE in CE," 3GPP TSG-RAN WG1 #82bis, R1-156286, Malmo, Sweden (Oct. 5-9, 2015).
Mediatek Inc., "DCI format design," 3GPP TSG-RAN WG1 #82bis, R1-155948, Malmo, Sweden (Oct. 5-9, 2015).
Sony, "Considerations on Paging in Coverage Enhanced operation," 3GPP TSG-RAN WG1 #82bis, R1-155614, Malmo, Sweden (Oct. 5-9, 2015).

* cited by examiner

METHODS OF PAGING PROCEDURES FOR REDUCED BANDWIDTH WTRUS

CROSS REFERENCE TO RELATED APPLICATIONS

This application is continuation of U.S. patent application Ser. No. 15/772,446 filed Apr. 30, 2018, which issued as U.S. Pat. No. 11,096,143 on Aug. 17, 2021, which is the U.S. National Stage, under 35 U.S.C. § 371, of International Application No. PCT/US2016/060554 filed Nov. 4, 2016, which claims the benefit of U.S. Provisional Application No. 62/250,803 filed Nov. 4, 2015, U.S. Provisional Application No. 62/290,790 filed Feb. 3, 2016, and U.S. Provisional Application 62/308,042 filed Mar. 14, 2016, the contents of which are hereby incorporated by reference herein.

BACKGROUND

As wireless communication systems such as Long Term Evolution (LTE) systems mature and their network deployment evolve, it may be beneficial for network operators to reduce the cost of the communication network, maintenance needs of the communication network or both. One technique to reduce the cost of the network may be to reduce the channel bandwidth and data rate used to communicate with devices.

For example, a portion of the channel bandwidth rather than the entire channel bandwidth may be supported by the devices in the network and/or the network itself when communicating with such devices. Current wireless communication systems, for example, LTE, have recently considered a bandwidth reduction for some devices including machine type communication (MTC) devices to some level, for example, 1.4 megahertz (MHz).

SUMMARY

Methods for paging for reduced bandwidth wireless transmit/receive units (WTRUs) in machine type communication (MTC) are provided. A WTRU may determine a paging narrowband (NB) for the WTRU, to use for monitoring an MTC physical downlink control channel (M-PDCCH), based on at least the most significant bits (MSBs) of a function of a WTRU-identifier (WTRU-ID). The WTRU may monitor for the M-PDCCH on the determined paging NB for the WTRU. The WTRU may then receive a downlink control information (DCI) on the monitored M-PDCCH on the determined paging NB during a paging occasion (PO). The DCI may include a scrambled cyclic redundancy check (CRC). The CRC may be scrambled with a Paging Radio Network Temporary Identifier (P-RNTI). Also, the WTRU may receive a physical downlink shared channel (PDSCH) associated with the M-PDCCH.

In an example, the WTRU may determine the paging NB based on at least the 3 MSBs of a function of the WTRU-ID. In another example, the WTRU may determine the paging NB based on at least the 4 MSBs of a function of the WTRU-ID.

Further, the PDSCH may be scheduled by the DCI. In an example, the DCI may include a paging message. In another example, the DCI may include system information update related information. In a further example, the PDSCH may include a paging message. In an additional example, the PDSCH may include system information update related information.

In addition, a WTRU may monitor for a M-PDCCH in an M-PDCCH search space. The WTRU may receive an M-PDCCH in the M-PDCCH search space, wherein the M-PDCCH has a starting enhanced control channel element (ECCE) index for the WTRU group containing the WTRU. Further, the WTRU may decode the M-PDCCH, wherein the M-PDCCH includes a DCI. In addition, the WTRU may receive a PDSCH associated with the M-PDCCH.

Further, the WTRU may receive, decode, and/or demodulate the PDSCH based on the DCI, wherein the PDSCH includes a paging message. The WTRU may then change operations based on the paging message. For example, the WTRU may change from idle mode to connected mode based on the paging message. In an example, the ECCE aggregation level may be 16.

In a further example, a WTRU may receive a PDCCH transmission in a WTRU-specific search space. The PDCCH transmission may include a sequence scrambled based on a first RNTI. Also, the first RNTI may be associated with the WTRU. Further, the sequence may include DCI and a CRC. The WTRU may determine scheduling information for a PDSCH transmission based on the DCI. Further, the WTRU may receive the PDSCH based on the scrambling information.

In an additional example, the first RNTI may be a WTRU-ID. Also, the DCI and CRC may be scrambled by a second RNTI. Further, the first RNTI may be the same as the second RNTI, in an example. In another example, the first RNTI may be different from the second RNTI. In a further example, the scrambling of the sequence may include an initialization by the first RNTI. The WTRU may also receive the first RNTI, in a further example.

Moreover, the WTRU may receive scrambling indication information indicating that scrambling of information in a PDCCH transmission by an RNTI may be used. Also, the PDCCH transmission may include the sequence on a condition that the scrambling indication information is received, in an example.

BRIEF DESCRIPTION OF THE DRAWINGS

A more detailed understanding may be had from the following description, given by way of example in conjunction with the accompanying drawings wherein.

DETAILED DESCRIPTION

Figure 1A:
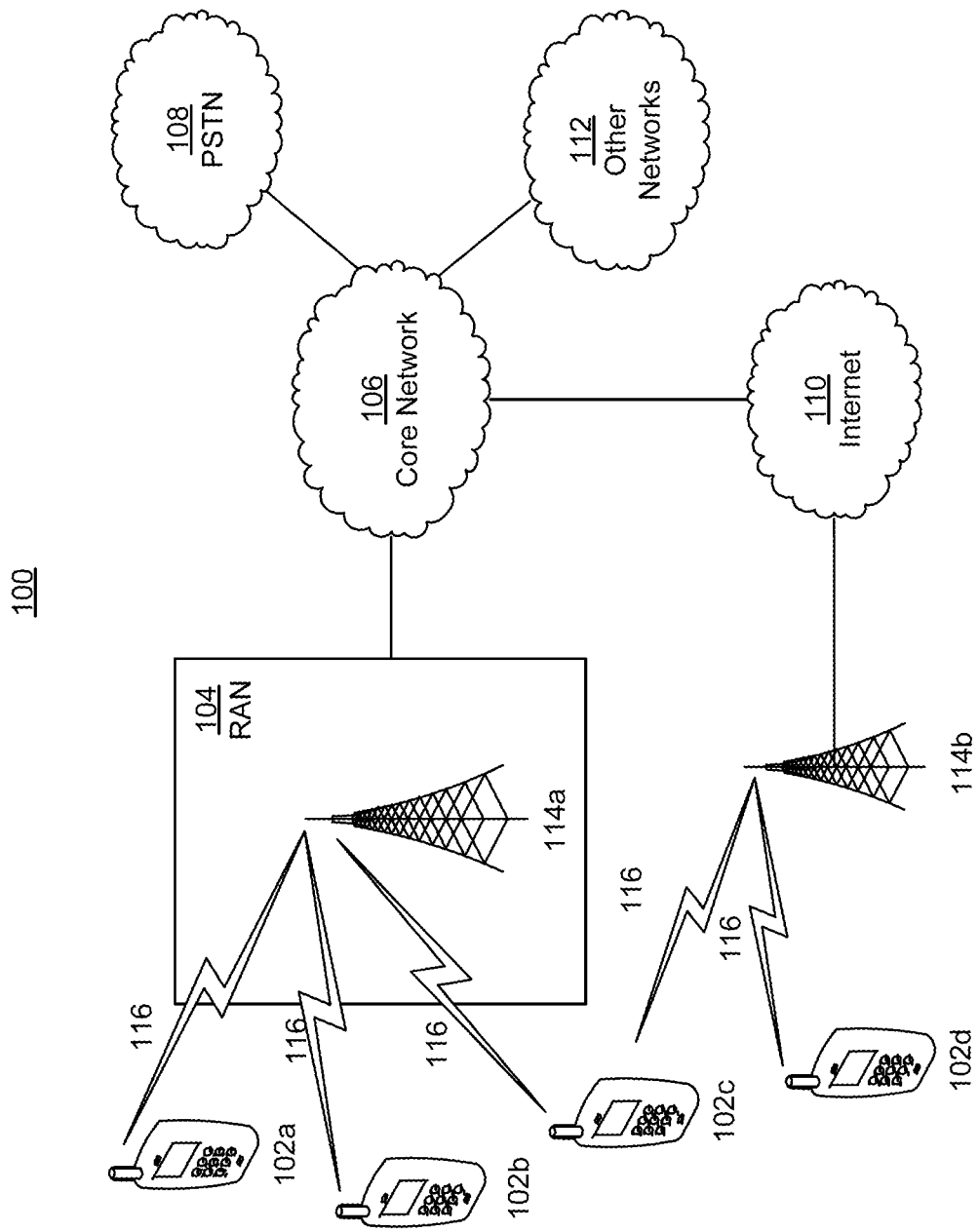
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102*a*, 102*b*, 102*c*, 102*d*, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d* may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114*a* and a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the core network 106, the Internet 110, and/or the other networks 112. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple-output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 116, which may be any suitable wireless communication link (for example, radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (for example, WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
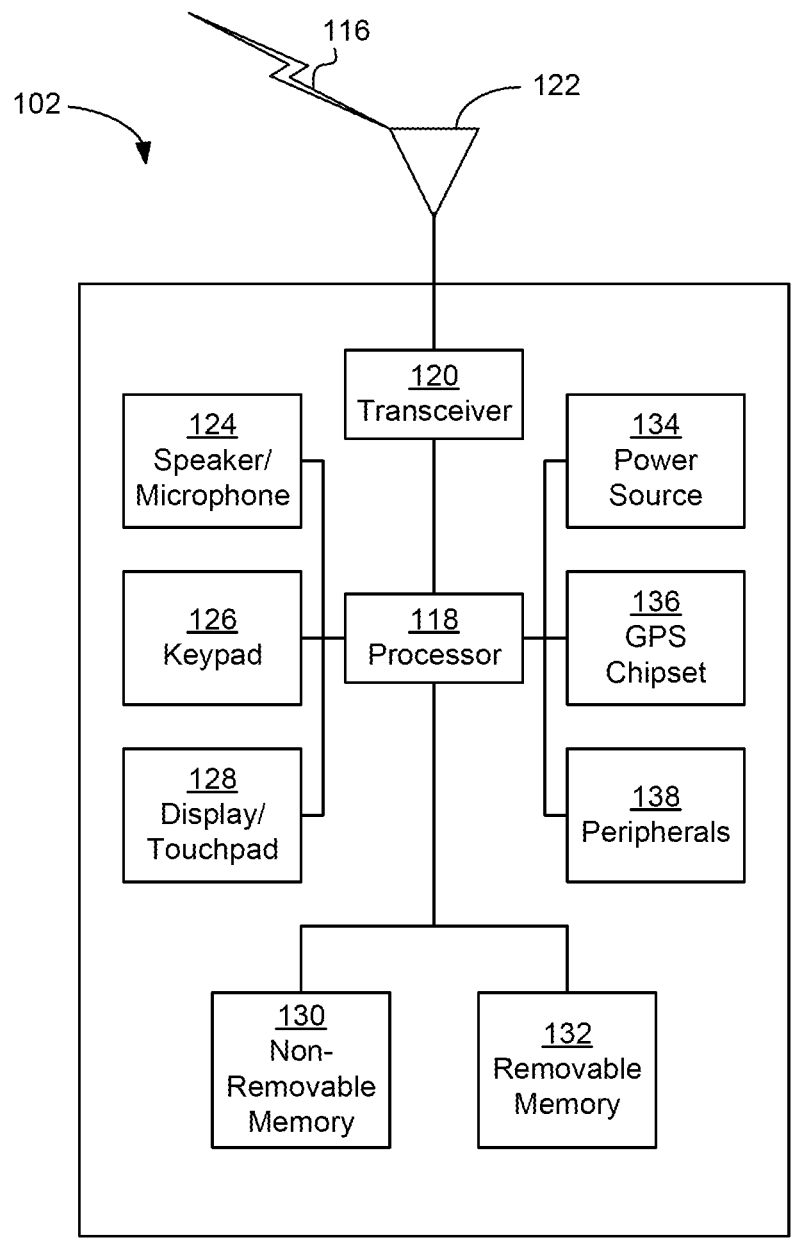
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (for example, the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (for example, multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (for example, a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (for example, nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (for example, longitude and latitude) regarding the current location of the WTRU 102. In addition to, or in lieu of, the information from the GPS chipset 136, the WTRU 102 may receive location information over the air interface 116 from a base station (for example, base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
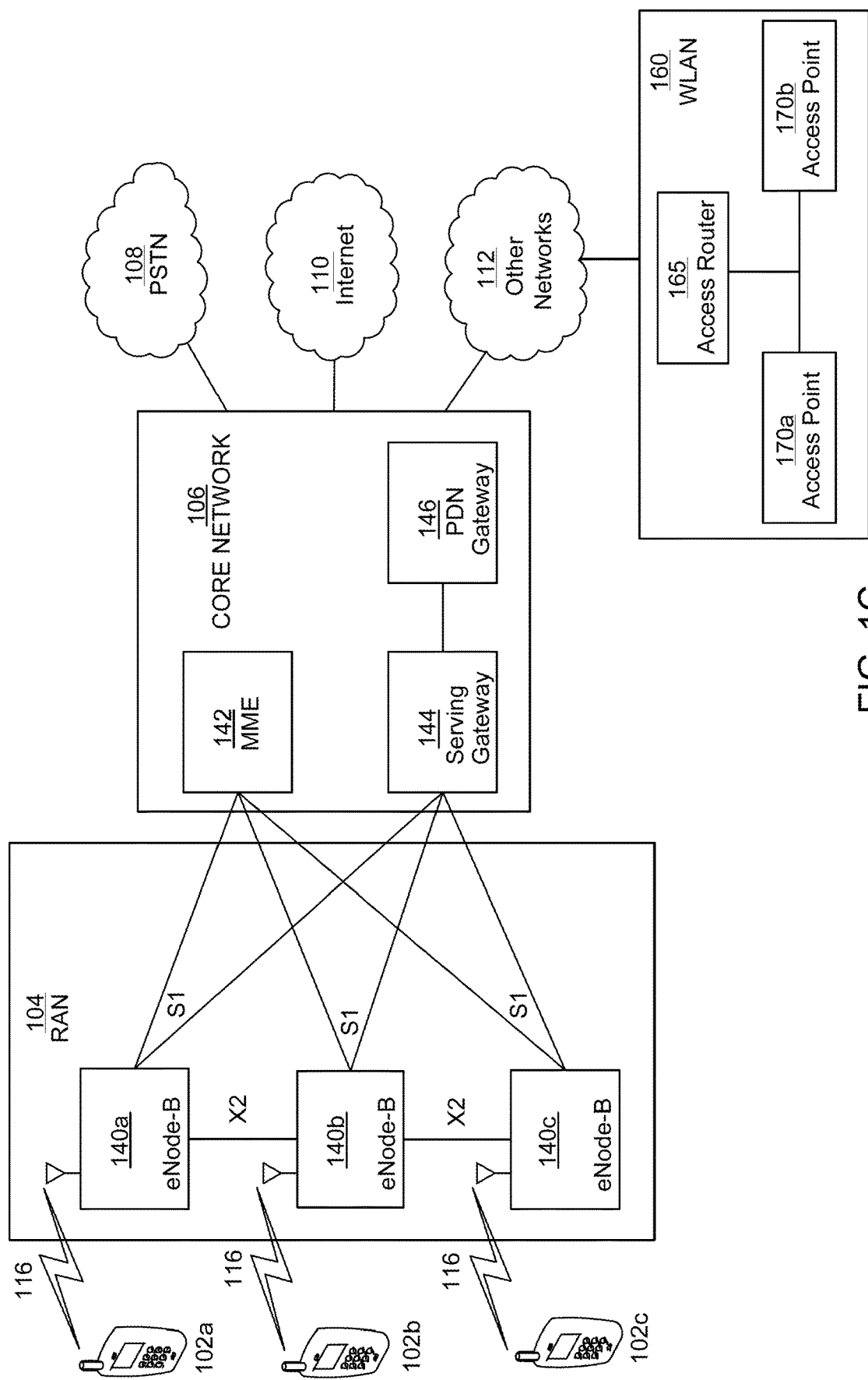
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (for example, an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

As wireless communication systems such as LTE systems mature and their network deployment evolve, it may be beneficial for network operators to reduce the cost of the communication network, maintenance needs of the communication network or both. One technique to reduce the cost of the network may be to reduce the channel bandwidth and data rate used to communicate with devices. For example, a portion of the channel bandwidth rather than the entire channel bandwidth may be supported by the devices in the network and/or the network itself when communicating with such devices. Current wireless communication systems, for example, LTE, have recently considered a bandwidth reduction for some devices including machine type communication (MTC) devices to some level, for example, 1.4 megahertz (MHz). The considered level may enable more compatibility with legacy systems and reduce the time and/or cost of a new design, since, for example LTE may already support operation with a system bandwidth of 1.4 MHz. Further bandwidth reduction, however, may be desirable for some devices, for example, smart watches and alarms, for example to reduce costs even further. Further reduction of the bandwidth, for example, on the order of 200 kilohertz (kHz), has been suggested. Additional system design may be needed to support operation with a reduced bandwidth which may be less compatible with legacy system operation.

A reduced bandwidth (BW) WTRU may be a WTRU which may support or may only support a certain limited BW, for example, RF BW or a certain limited number of resource blocks (RBs) in the downlink (DL) and/or uplink (UL), which may be independent of the BW of the eNode-B or cell with which the WTRU may communicate. For example, a reduced BW WTRU, which may also be referred to as a limited BW WTRU, may support or may only support a certain number of RBs, for example, 6 RBs or 1 RB, or a certain BW, for example, 1.4 MHz or 180 kHz, for transmission and/or reception. Such a WTRU may communicate with an eNode-B or cell for which the BW may be larger, for example, 20 MHz or 100 RBs.

An enhanced machine type communication (eMTC) WTRU may be a limited BW WTRU which may support a first number of RBs and/or a BW of a first bandwidth. A first number may be represented by N1 and a first bandwidth may be represented by B1. N1 may, for example, be 6 and B1 may, for example be 1.4 MHz. In an example, 6 RBs may correspond to a BW of 1.4 MHz. An eMTC WTRU may be used to represent a non-limiting example of a limited BW WTRU. Another WTRU which may be referred to as a narrowband LTE (NB-LTE) or narrowband internet of things (NB-IoT) WTRU may be a limited BW WTRU which may support a second number of RBs and/or a BW of a second bandwidth. A second number may be represented by N2 and a second bandwidth may be represented by B2. N2 may be less than N1. B2 may be less than B1. N2 may, for example, be 1 and B2 may, for example, be 180 kHz. In an example, 1 RB may correspond to a BW of 180 kHz. An NB-LTE WTRU and/or NB-IoT WTRU may be used to represent a non-limiting example of a limited BW WTRU. A narrowband (NB) WTRU may be used to represent a non-limiting example of a WTRU or limited BW WTRU. WTRU, limited BW WTRU, BW limited WTRU, reduced BW WTRU, limited capability WTRU, low cost-MTC (LC-MTC) WTRU, low-complexity WTRU, MTC WTRU, eMTC WTRU, NB-IoT WTRU, eMTC, NB-IoT, and NB WTRU may be used interchangeably herein. An RB may be a physical RB (PRB). The terms RB and PRB may be used interchangeably herein.

A limited BW WTRU may use or require special procedures to operate in a portion of the full BW of the cell. Reduced bandwidth, limited bandwidth, and bandwidth limited may be used interchangeably herein. A WTRU which may support the full BW of a cell may be referred to as a full BW WTRU. BW may include a number of RBs and/or a location in a band such as the center of the band.

A WTRU may at least sometimes communicate, behave, or operate in a manner which may be consistent, or for example, at least partially consistent, with that of a full BW WTRU and may also at least sometimes, for example, some other times than when operating as a full BW WTRU, communicate, behave, or operate in a manner which may be consistent, or for example, at least partially consistent, with that of a reduced BW WTRU. For example, a WTRU which may support the full BW of a cell may communicate, behave, or operate in a manner which may be consistent, or for example, at least partially consistent with that of a reduced BW WTRU at certain times such as when it may be coverage limited or when it may operate in a coverage enhanced mode. A WTRU, such as this example WTRU, may be or may be considered a full BW WTRU at times and/or a reduced BW WTRU at times, for example at other times.

A WTRU may be or may be considered to be a reduced BW WTRU while it may, may need to, or may intend to behave or operate like, or for example, at least partially like, a reduced BW WTRU. A WTRU that may communicate, for example, with an eNode-B, behave, or operate in a manner which may be consistent, or for example, at least partially consistent with that of a reduced BW WTRU may be or may be considered to be a reduced BW WTRU, for example at least sometimes, such as when the WTRU may communicate, behave, or operate in a manner which may be consistent, or for example, at least partially consistent, with that of a reduced BW WTRU.

It should be noted that the terms eNB, eNode-B and cell may be used interchangeably herein. Embodiments and examples described for reduced BW WTRUs may be applied to coverage limited WTRUs and vice versa.

Coverage limited and reduced BW WTRUs are examples of WTRUs which may use the example methods and procedures described herein. These coverage limited and reduced BW WTRUs are non-limiting examples of such example WTRUs. Application to a WTRU of any kind, with any capabilities, or reduced capabilities may still be consistent with the example methods and procedures described herein.

The term physical downlink control channel (PDCCH) may be replaced by enhanced PDCCH (EPDCCH), machine type communication (MTC) physical downlink control channel (M-PDCCH), or another DL control channel, and vice versa and still be consistent with the example methods and procedures described herein. The terms component carrier (CC) and serving cell may be used interchangeably herein. The terms WTRU, WTRU medium access control (MAC) entity, and MAC entity may be used interchangeably herein.

The terms a WTRU, a certain WTRU or certain WTRUs may be replaced by at least a WTRU, at least a certain WTRU or at least certain WTRUs and still be consistent with the example methods and procedures described herein. The phrase intended for may be replaced by at least intended for or intended for at least and still be consistent with the example methods and procedures described herein.

The example methods and procedures described herein may be described for a random access response (RAR), paging channel (PCH), or physical downlink shared channel (PDSCH) carrying or which may carry a RAR or PCH. These are used as non-limiting examples. RAR may be replaced by PCH or PCH PDSCH and vice versa and still be consistent with the example methods and procedures described herein. The channel or other contents which may be carried by the PDSCH may be replaced with any channel or contents and still be consistent with the example methods and procedures described herein.

Example methods and procedures involving coverage enhancement (CE) are disclosed herein. A coverage enhanced WTRU may be a WTRU which may require coverage enhancement or a WTRU which may employ coverage enhancement techniques or may support a CE mode. The terms coverage limited WTRU and coverage enhanced WTRU may be used interchangeably herein. CE may refer to extending or improving coverage, for example for low data rate applications. CE may refer to extending or improving coverage, for example to enable communication with devices with reduced capabilities such as devices employing a single receiver or devices using a reduced bandwidth. CE may refer to extending or improving coverage, for example to enable communication with devices for which communication may be hampered such as indoor devices or devices in basements where penetration losses may impede communication. In at least some examples, CE may involve extending or improving coverage by reducing the data rate. In at least some examples, CE may involve extending or improving coverage by employing repetition techniques. In at least some examples, CE may be used for MTC applications. In at least some examples, CE may be used for NB or NB-IoT applications. The terms CE operation and coverage enhanced operation may be used interchangeably herein.

A repetitive transmission of a physical channel may be used for CE. The CE level may be determined based on the number of repetitions, for example, that may be needed or used to achieve the intended coverage improvement. The terms repetition number, number of repetitions, repetition level, and CE level may be used interchangeably herein.

A CE mode may be used with one or more CE levels, or for example, repetition levels. The CE levels or repetition levels supported within a CE mode may be changed dynamically.

An eMTC WTRU may be for example, a low-cost WTRU. An eMTC WTRU may be for example, a WTRU with limited or reduced capabilities. Limited or reduced capabilities may include at least one of a limited or reduced BW capability, for example a BW using 6 RBs, low throughput performance, and a single RF chain at the receiver. An eMTC WTRU may be delay tolerant. An eMTC WTRU may be served in an LTE network which may or may not have a system BW larger than the eMTC supportable BW that may for example be a BW of 1.4 MHz.

An eMTC WTRU may support coverage enhanced operation. For example, two CE modes of operation may be supported such as CE mode-A and CE mode-B. Normal and small CE levels may be supported in CE mode-A, and medium and large CE levels may be supported in CE mode-B. Normal CE may be the same as normal operation or no CE, which may involve for example, no use of repetitions for CE.

An NB-IoT WTRU may be, for example, a low-cost WTRU. An NB-IoT WTRU may be, for example, a WTRU with limited or reduced capabilities that may, for example, be more limited or reduced more than the capabilities of an eMTC WTRU in at least one aspect. For example an NB-IoT WTRU may support or use a further reduced BW, for example, a BW of 1 RB, that may be smaller than the supportable BW for an eMTC WTRU.

An NB-IoT WTRU may, or may be intended to, support CE, for example, with up to 20 decibel (dB) CE, with a battery life that may be longer than the intended or expected battery life of an eMTC WTRU. An NB-IoT WTRU may be intended or expected to support a battery life such as 10 years. The population of NB-IoT WTRUs in a cell may be significantly larger than for other types of devices.

Example methods and procedures of paging are discussed herein. As used herein, paging may refer to network initiated connection setup. As used herein, paging may refer to a mechanism that a network may use to provide information such as system information modification information or warning system information, for example Earthquake and Tsunami Warning System (ETWS) information, to one or more WTRUs that may, for example, employ techniques for battery saving such as discontinuous reception (DRX). In some examples, paging may be used when a WTRU is in idle mode. In other examples, paging may be used when a WTRU is in connected mode. A WTRU may, for example periodically, monitor a PDCCH for a DL control information (DCI) or DL assignment on a PDCCH masked with a Paging Radio Network Temporary Identifier (P-RNTI), for example in idle mode and/or in connected mode. When a WTRU detects or receives a DCI or DL assignment using a P-RNTI, the WTRU may demodulate the associated or indicated PDSCH RBs and/or may decode a Paging Channel (PCH) that may be carried on an associated or indicated PDSCH. A PDSCH which may carry PCH may be referred to as a PCH PDSCH. The terms paging, paging message, and PCH may be used interchangeably herein. As used herein, the terms downlink control channel, DL control channel for NB WTRU, M-PDCCH, PDCCH, NB PDCCH (NB-PDCCH), internet of things PDCCH (IoT-PDCCH), and NB IoT-PDCCH (NB-IoT-PDCCH) may be used interchangeably.

The paging frame (PF) and subframe within that PF, for example, the paging occasion (PO), that a WTRU may monitor for the paging channel, for example in idle mode, may be determined based on the WTRU identifier (ID), for example, WTRU_ID or UE_ID, and parameters which may be specified by the network. The parameters may include the Paging Cycle (PC) length, for example in frames, which may be the same as a discontinuous reception (DRX) cycle and another parameter, for example, nB, which together may enable the determination of the number of PF per PC and the number of PO per PF which may be in the cell. The WTRU ID, in an example, may be the WTRU international mobile subscriber identity (IMSI) mod 1024. The terms WTRU ID, WTRU-ID, and WTRU_ID may be used interchangeably herein.

From the network perspective, there may be multiple PFs per paging cycle and multiple POs within a PF, for example, more than one subframe per paging cycle may carry PDCCH masked with a P-RNTI. Additionally, from the WTRU perspective, a WTRU may monitor a PO per paging cycle, and such a PO may be determined based on the parameters specified herein, which may be provided to the WTRU via system information, dedicated signaling information, and the like. POs may include pages for one or more specific WTRUs, or they may include system information change pages which may be directed to each of the WTRUs, multiple WTRUs, or all WTRUs. In idle mode, a WTRU may receive pages for reasons such as an incoming call or system information update changes.

In connected mode, a WTRU may receive pages related to system information change, for example, and the WTRU may not receive WTRU-specific pages such as those that may be used for an incoming call. As such, a WTRU in connected mode may not monitor a specific PO. Additionally, for frequency division duplex (FDD), the PO subframes may be limited to certain subframes such as subframes 0, 4, 5 and 9 and/or for time division duplex (TDD), the PO subframes may be limited to certain subframes such as subframes 0, 1, 5 and 6.

As used herein, DRX may refer to a WTRU monitoring for DL control signaling or a DL control channel at certain times, for example only at certain times, during a cycle. For example, a WTRU using DRX may monitor for a DL control channel during certain time periods, for example only during certain time periods. During other time periods, the WTRU may switch off at least part of its receiver circuitry and reduce power consumption. A time period may, for example, be a subframe. Example methods for operation using DRX are discussed herein.

In idle mode, for example, radio resource control (RRC) idle mode and/or evolved packet system (EPS) connection management (ECM) idle mode, a WTRU may monitor for or listen to a paging message to know about one or more of: an incoming call, a system information change, an Earthquake and Tsunami Warning System (ETWS) notification for ETWS capable WTRUs, a commercial mobile alert service (CMAS) notification and an extended access barring (EAB) parameters modification.

A WTRU may monitor PDCCH for P-RNTI discontinuously, for example to reduce battery consumption when there may be no pages for the WTRU. DRX may be or may include the process of monitoring PDCCH discontinuously. In idle mode, DRX may be or may include the process of monitoring PDCCH discontinuously for P-RNTI, for example to monitor or listen for a paging message during RRC idle state.

The terms idle mode, idle state, RRC idle mode, RRC idle state, and RRC_IDLE mode or state may be used interchangeably herein. The terms RRC idle and ECM idle may be used interchangeably herein. DRX may also be enabled and/or used in connected mode. When in connected mode, if DRX is configured, the MAC entity may monitor the PDCCH discontinuously, for example using DRX operation. The terms connected mode, connected state, and RRC_CONNECTED mode or state may be used interchangeably herein.

Examples of operation in idle mode DRX are discussed herein. A WTRU may use one or more DRX parameters that may be broadcast, for example in a system information block (SIB) such as a SIB2, to determine the PF and/or PO to monitor for paging. The WTRU may, for example, alternatively, use one or more WTRU specific DRX cycle parameters that may be signaled to the WTRU, for example by the MME through non-access stratum (NAS) signaling.

Table 1 provides examples of DRX parameters including example ranges and an example source of the DRX parameter, for example, an eNode-B or an MME.

TABLE 1

Example DRX Cycle Parameters.

| DRX parameter | Notation | Value Range | Configuring Network Node |
|---|---|---|---|
| WTRU Specific DRX cycle | TWTRU | 32, 4, 128 and 256 radio frames where each radio frame may be 10 milliseconds (ms) | MME, for example, via NAS signaling |
| Cell specific DRX cycle | TCELL | 32, 4, 128 and 256 radio frames | eNode-B, for example, via system information such as a SIB2 |
| Number of POs per DRX cycle, for example, DRX cycle across all users in the cell | nB | 4T, 2T, T, T/2, T/4, T/8, T/16, T/32 where T may be the DRX cycle of the WTRU, for example, TCELL or the smaller of TWTRU, if provided, and TCELL | eNode-B, for example, via system information such as a SIB2 |

The DRX cycle T of a WTRU may indicate the number of radio frames in the paging cycle. A larger value of T may result in less WTRU battery power consumption. A smaller value of T may increase WTRU battery power consumption. A DRX cycle may be cell specific or WTRU specific.

A DRX cycle provided by an eNode-B may be cell specific and may be provided to at least some, or for example all, WTRUs in a cell. The DRX cycle that may be provided by the eNode-B may be the default paging cycle. A DRX cycle provided by an MME may be WTRU specific. The WTRU may use the smaller of the default paging cycle and the WTRU specific DRX cycle as its DRX or paging cycle. An MME may provide a WTRU specific DRX cycle to a WTRU using NAS signaling, for example as 'WTRU specific DRX cycle'. An MME may provide a WTRU specific DRX cycle to an eNode-B in a PAGING S1 AP message, as 'Paging DRX', for example, for an MME initiated paging message that may be intended for the WTRU.

The WTRU and/or eNode-B may use the minimum of the default and WTRU specific DRX cycle. For example, T=Min ($T_{WTRU}$, $T_{CELL}$) in radio frames. A WTRU with a DRX cycle of N (for example, 128) radio frames may wake up or may need to wake up every N×frame time (for example, every 1.28 seconds for a frame time of 10 ms) and look for a paging message.

The parameter nB may indicate the number of paging occasions or POs in a cell specific DRX cycle. The parameter may be cell specific. Configuration of the nB value may depend on the paging capacity that may be desired or used in a cell. A larger value of nB may be used, for example to increase paging capacity. A smaller value of nB may be used, for example for a smaller paging capacity.

The eNode-B and/or WTRU may calculate the WTRU's PFs according to the following relation: a PF is given by the following equation or occurs when SFN mod T=(T div N)*(WTRU_ID mod N), where N=min (T, nB) and div may represent division. The WTRU specific PO within the PF may be determined from a set of paging subframes. The set may be a function of predefined allowed subframes for paging and/or the number of POs per PF which may be a function of at least nB and/or T. The system frame number (SFN) may have a range of values such as 0 through 1023.

Examples of connected mode DRX are discussed herein. In connected mode, a PF and PO may be determined in a similar manner as in idle mode. The DRX cycle parameters may be different for idle and connected modes. A WTRU may monitor a PO, for example, any PO, in a PC in connected mode, for example to obtain system information change information.

Extended DRX (eDRX) is disclosed herein. It may be desirable to have extended or longer DRX cycles, for example for devices such as MTC devices. Extended or longer DRX cycles may be useful for some devices such as delay tolerant devices and may, for example, reduce battery consumption and/or increase battery life for those devices. A new time unit, for example, a hyper frame (HF), may be used, for example, with, as an extension of, or on top of radio frames and/or SFN timing, for example, legacy SFN timing.

Figure 2:
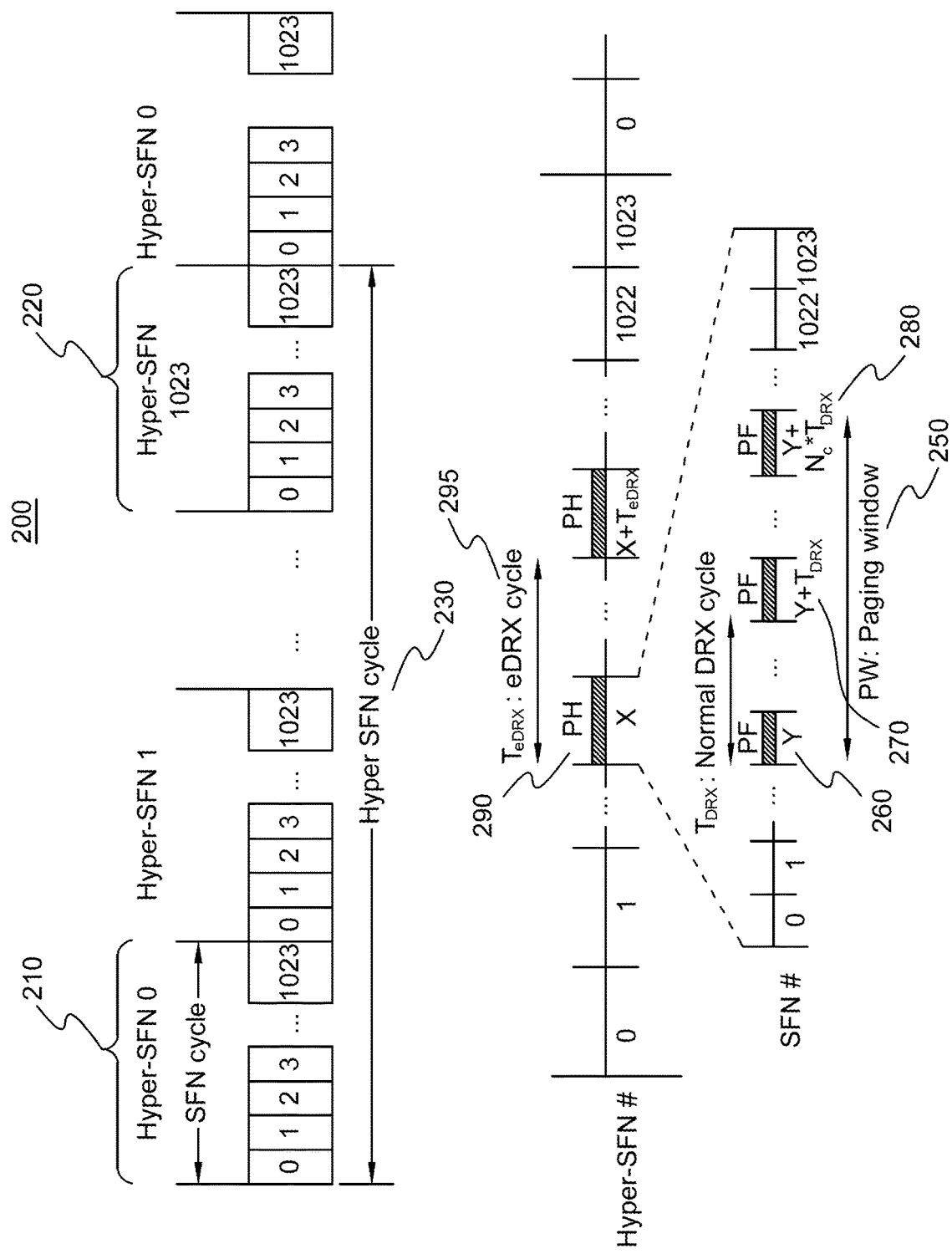
FIG. 2 is an exemplary timing diagram which illustrates hyper frames and paging within hyper frames.

FIG. 2 is an exemplary timing diagram which illustrates HFs and paging within HFs. One HF may include an SFN cycle, for example, 1024 radio frames or 10.24 s. A HF may have a Hyper-System Frame Number (H-SFN). An H-SFN cycle may be 1024 SFN cycles. An H-SFN cycle may last 1024*1024*10 ms, for example, 174.76 minutes. In an example shown in timing diagram 200, HF 210 may have H-SFN 0 and may contain an SFN cycle of 1024 radio frames, from radio frame 0 through radio frame 1023. Likewise, HF 220 may have H-SFN 1023 and contain its own SFN cycle of 1024 radio frames. H-SFN cycle 230 may contain 1024 HFs, including HF 210 through HF 220.

An idle mode extended DRX (I-eDRX) cycle may include up to 256 H-SFN cycles and may, for example, last 256*1024*10 ms, for example, 43.69 minutes. The H-SFN may be broadcast by the cell. The H-SFN may increment at SFN cycle boundaries.

The H-SFN in which a WTRU may become reachable for paging may be referred to as a paging hyper frame (PH) or as the WTRU's PH. The PH may be applicable, or only applicable, in ECM-IDLE. The PH may be computed as a function of the extended DRX cycle and/or WTRU ID, for example, IMSI mod 1024. Within a PH, the determination of the PF and/or PO may follow the regular DRX rules and/or formulas. A WTRU's paging window (PW) may be the window or time span corresponding to the set of PFs in the WTRU's PH during which the WTRU may monitor for paging and/or may be paged. The PW may include a subset of the available PFs in the PH. In an example shown in timing diagram 200, PW 250 may include PF 260, PF 270 and PF 280. PF 260, PF 270 and PF 280 may be PFs within PH 290. eDRX cycle 295 may include PH 290. The PW may be signaled to the WTRU, for example by the MME in a NAS message. In a PF, a WTRU may monitor or only monitor one PO. Paging to a WTRU may be repeated in one or more of a WTRU's PFs in its PW, for example if the WTRU does not respond to a previous page.

A cell's support of idle mode extended DRX may be implicitly indicated by the broadcast of H-SFN. For long DRX cycles, it may be useful for the MME to have some awareness of when the WTRU may be become reachable, for example to avoid storing paging requests at the eNode-B for a long time. In connected mode, the DRX cycle may be extended up to the SFN limit, for example, by extending the range of values for long DRX cycles to 10.24 seconds.

A large population of NB WTRUs may be multiplexed within a limited number of paging resources. If the distribution of WTRUs among paging resources is based on WTRU-ID, for example IMSI or IMSI modulo 1024, there may, for example still be a large number of WTRUs sharing the same paging resources in time and/or frequency, for example sharing the same PO and/or paging NB.

A NB WTRU may monitor M-PDCCH in a PO or each of its POs. If the M-PDCCH, or a DCI in the M-PDCCH, indicates the scheduling of an associated PDSCH for paging message, the NB WTRU may receive the associated PDSCH, for example, to check if there may be a paging message targeted to the NB WTRU.

Since a large number of NB WTRUs may share the same paging resources, a NB WTRU may receive the associated PDSCH when the paging message may not be targeted to the NB WTRU. The reception of an associated PDSCH that may not be intended for the WTRU may, for example, increase the WTRU's battery consumption unnecessarily. If the NB WTRU is in a CE level that may use a large number of repetitions, the impact to the WTRU may be worse, and may be, for example, significantly worse.

A NB WTRU may monitor M-PDCCH, for example in a PO or in each PO, in a NB WTRU specific or a NB WTRU group specific manner. The M-PDCCH may implicitly or explicitly indicate the necessity of receiving and/or decoding the M-PDCCH and/or an associated PDSCH, for example by a WTRU or group of WTRUs. For example, the M-PDCCH may implicitly or explicitly indicate the intended recipient or recipients of the M-PDCCH, an associated PDSCH, a page, a paging message or a PDSCH carrying a paging message or channel. Further, an implicit indication of paging reception, the need for paging reception, or the intended recipient or recipients of a M-PDCCH, a PDSCH, a page, a paging message or a PDSCH carrying a paging message or channel may be employed which uses one or more of: a scrambling indication; a scrambling sequence such as a scrambling sequence for M-PDCCH randomization, a WTRU group-specific or WTRU-specific scrambling sequence, an information type specific scrambling sequence, or a scrambling sequence for paging reception; a starting enhanced control channel element (ECCE) index for M-PDCCH randomization, a bit interleaver for M-PDCCH randomization; and/or one or more Radio Network Temporary Identifiers (RNTIs).

In an example, a scrambling sequence may be used to randomize a bit sequence of an M-PDCCH. A WTRU that may use the same scrambling sequence to descramble the received bits may receive or may be able to receive the M-PDCCH. In an example, only a WTRU that may use the same scrambling sequence to descramble the received bits may receive or may be able to receive the M-PDCCH.

The bit sequence of an M-PDCCH may be a bit sequence before the modulation of M-PDCCH. For example, the bit sequence of an M-PDCCH may be a bit sequence after rate matching. A coded bit sequence may be an input bit sequence of the rate matching and an output bit sequence of the rate matching may be the bit sequence of an M-PDCCH. A DCI with cyclic redundancy check (CRC) scrambled by an RNTI may be an input bit sequence of the channel coding block and an output bit sequence may be a coded bit sequence.

The bit sequence of an M-PDCCH may be a bit sequence before the channel coding. For example, a DCI with CRC scrambled by an RNTI may be the bit sequence of an M-PDCCH.

For the RNTI, one or more of following examples may apply. The RNTI may be a P-RNTI, for example, if the DCI may be used for the paging. In another example, the RNTI may be a group-specific P-RNTI which may be associated with a scrambling sequence. In a further example, the RNTI may be the N least significant bits (LSBs) of a WTRU-ID that may be used for paging. N may be the number of CRC bits, which may be referred to as NCRC. For example, the 16 LSBs of a WTRU-ID, for example, IMSI or System Architecture Evolution (SAE)-Temporary Mobile Subscriber Identity (s-TMSI), may be used. The N bits used for the RNTI may be the same N bits that correspond to WTRU-ID modulo ($2^N$), for example, IMSI modulo ($2^N$), where N may be 16.

In an example, a bit sequence of M-PDCCH $b(0), \ldots, b(M_{bit}-1)$ may be scrambled with a certain scrambling sequence, $c(i)$, where $M_{bit}$ may be the number of bits in the bit sequence of an M-PDCCH. The result of a WTRU-specific or a WTRU group-specific scrambling sequence may be referred to as $\tilde{b}(0), \ldots, \tilde{b}(M_{bit}-1)$.

In an example, the $\tilde{b}(0), \ldots, \tilde{b}(M_{bit}-1)$ bit sequence may be determined based on $\tilde{b}(i)=(b(i)+c(i))\mod 2$, where mod 2 may be modulo-2 operation. Further, the scrambling sequence $c(i)$ may be a Pseudo-random sequence that may be determined based on an initialization value, $c_{init}$, where i may be a bit index of the bit sequence.

The certain scrambling sequence may be determined based on at least one of whether the M-PDCCH or scrambling sequence may be WTRU-specific or WTRU group-specific, information type in the associated DCI and information type in the associated PDSCH. The initialization value ($c_{init}$) may be determined based on at least the WTRU-ID, at least the associated WTRU group number, at least the information type in the associated DCI, at least the information type in the associated PDSCH and/or an RNTI.

In an example, a WTRU which may monitor or attempt to decode a bit sequence of M-PDCCH may use its associated scrambling sequence. The associated scrambling sequence may be determined based on at least one of whether the M-PDCCH or scrambling sequence may be WTRU-specific or WTRU group-specific, and/or information type in the DCI. For example, the associated scrambling sequence may be determined based on the type of the information in the DCI for which the WTRU may be monitoring, such as WTRU-specific or WTRU group-specific paging. In an example, the WTRU may perform descrambling with an input bit sequence of the channel decoder. Also, the WTRU may perform descrambling with an output bit sequence of the channel decoder. In an example, if the bit sequence of M-PDCCH received at the WTRU receiver is $d(0), \ldots, d(M_{bit}-1)$ the $\tilde{d}(0), \ldots, \tilde{d}(M_{bit}-1)$ sequence may be referred to as a descrambled bit sequence with the associated scrambling sequence $c(i)$. As an example, the WTRU may perform descrambling with $\tilde{d}(i)=(d(i)+c(i))\mod 2$.

A WTRU-specific scrambling sequence and/or a WTRU group-specific scrambling sequence may be provided and/or used. In an example, a WTRU-specific or WTRU group-specific scrambling sequence, for example a first scrambling sequence, may be used to scramble a bit sequence of an M-PDCCH, for example in a PO or each PO. In an example, a WTRU or a WTRU group that may use the same scrambling sequence, for example the first scrambling sequence, may decode or may be able to decode the M-PDCCH. For example only a WTRU or a WTRU group that may use the same scrambling sequence, for example the first scrambling sequence, may decode or may be able to decode the M-PDCCH.

In an example of using a WTRU group-specific scrambling sequence, $N_g$ scrambling sequences may be used for $N_g$ WTRU groups for a PO and a bit sequence of M-PDCCH intended or targeted for a WTRU group, for example a first WTRU group, within $N_g$ WTRU groups may be scrambled with the corresponding scrambling sequence, for example a first scrambling sequence. In an example, the WTRU group using the corresponding scrambling sequence, for example the first scrambling sequence, may receive or may be able to receive the M-PDCCH. In a further example, only the WTRU group using the corresponding scrambling sequence, for example the first scrambling sequence, may receive or may be able to receive the M-PDCCH. The WTRU group-specific scrambling sequence may be determined based on at least one of following: a modulo operation that may, for example, be based on at least $N_g$ and the WTRU-ID; a hashing function that may, for example, be based on $N_g$ and the WTRU-ID; and the WTRU group number that may, for example, be determined based on at least a CE level.

A modulo operation may be used where the modulo operation may be based on at least $N_g$ and the WTRU-ID ($N_{WTRUID}$). The WTRU group number ($N_{group}$) may be determined by WTRU-ID modulo $N_g$ (for example $N_{group} = (N_{WTRUID}) \bmod N_g$). A subframe number and/or a frame number (for example SFN) may be used. For example, $N_{group} = (N_{WTRUID} \cdot N_{Frame}) \bmod N_g$.

A hashing function may be used where the hashing function may be based on $N_g$ and the WTRU-ID. In this case, for example, $N_{group} = (A \cdot N_{WTRUID}) \bmod N_g$, where the A may be a prime number (for example A=39,827), or $N_{group} = ((A \cdot N_{WTRUID}) \bmod D) \bmod N_g$, where the D may be a prime number which may be different from A (for example D=65,537). The hashing function may be based on a subframe number and/or a frame number.

The WTRU group number may be determined based on at least a CE level. For example, WTRUs with a first CE level (for example CE level-1) may be grouped as a first WTRU group and WTRUs with a second CE level (for example CE level-2) may be grouped as a second WTRU group.

The WTRU-ID may be at least one of an RNTI allocated for a WTRU, IMSI, and s-TMSI, and/or a part of at least one of the allocated RNTI, IMSI, and s-TMSI. For example, WTRU-ID may be IMSI modulo M or s-TMSI modulo N. M and/or N may be 1024. A and/or D may be a function of $N_g$. A and/or D may be fixed and/or configured, for example, by the eNode-B via signaling. A $N_{WTRUID}$ may be the WTRU-ID or a portion of or function of the WTRUs IMSI or s-TMSI. For example $N_{WTRUID}$ for a WTRU may be IMSI-10, or IMSI modulo X, where X may be a number less than or equal to 1024.

In an example of using a WTRU specific scrambling sequence, a WTRU specific scrambling sequence may be used for a bit sequence of M-PDCCH intended or targeted for a WTRU, where the WTRU specific scrambling sequence may be determined based on at least a WTRU-ID or a part of a WTRU-ID. In MME initiated paging, the WTRU-ID may be provided by the MME to the eNode-B in an S1 paging message or request.

In an example, the scrambling sequence may be determined based on the specific information type which may be carried in the DCI. For example, a first scrambling sequence may be used for a bit sequence of an M-PDCCH in which the DCI may carry a first information type and a second scrambling sequence may be used for a bit sequence of an M-PDCCH in which the DCI may carry a second information type.

The first information type may include, but not be limited to, at least one or more system information update indications such as system information modification indication, an ETWS indication, a CMAS indication, and an EAB parameter modification indication. One or more system information indications may be a single bit to indicate the system information update or multiple bits to indicate the system information update of multiple SIs, for example, SIBs or SI-messages. An additional indicator may be included, for example, a flag bit to indicate a DCI format or a DCI type. The scrambling sequence for the first information type may be based on at least one of cell-specific parameters, such as for example, a physical cell-ID.

The second information type may be at least scheduling information of the associated PDSCH. The scrambling sequence for the second information type may be based on at least one of WTRU-specific parameters, such as for example, a WTRU-ID.

In another example, the scrambling sequence may be determined based on the information type carried in a DCI and/or WTRU-ID. For example, a first scrambling sequence may be used for a bit sequence of an M-PDCCH in which the DCI may carry a first information type, and a second scrambling sequence may be used for a bit sequence of an M-PDCCH in a which the DCI may carry a second information type. The first scrambling sequence may be predefined. The second scrambling sequence may be determined based on a WTRU-ID.

In an example, the PO for the first information type and the second information type may the same. Further, a WTRU may monitor M-PDCCH for both the first information type and the second information type. Also, a WTRU may monitor M-PDCCH for the first information type in a subset of POs or all POs. A WTRU may monitor M-PDCCH for the second information type in a subset of POs or all POs.

In another example, the PO for the first information type and the second information type may be different. The time and/or frequency location of the PO for the first information type may be determined based on at least one cell-specific parameter. The cell-specific parameters may include, for example, a physical cell-ID, a system bandwidth, a subframe number, a frame number such as an SFN and the like. The time and/or frequency location of the PO for the second information type may be determined based on at least one WTRU-specific parameter, such as, for example, a WTRU-ID.

Examples which include the use of a scrambling sequence for paging reception are disclosed herein. A WTRU may determine a bit scrambling sequence, for example, an M-PDCCH bit scrambling sequence according to one or more examples described herein. In an example, the WTRU may monitor for an M-PDCCH in a PO. The WTRU may descramble the received signal or M-PDCCH using the bit scrambling sequence. The WTRU may determine if the descrambled M-PDCCH may carry a DCI masked with an RNTI that the WTRU may use for paging. The RNTI may be, for example, a P-RNTI. If the WTRU determines the DCI is masked with the RNTI, such as, for example, the P-RNTI, the WTRU may read the contents of the DCI to obtain one or more of system information update information and/or PDSCH scheduling information. The WTRU may use the scheduling information to receive an associated PDSCH that may carry one or more paging records or paging messages.

Examples using a starting ECCE index for M-PDCCH randomization are disclosed herein. In an example, an M-PDCCH search space may be used for monitoring for an M-PDCCH or a DCI, where the starting ECCE index, for example for monitoring, may be determined based on at least one WTRU-specific parameter. For example, a WTRU may use an M-PDCCH search space for monitoring for a an M-PDCCH or a DCI, where the starting ECCE index, for example for monitoring, may be determined based on at least one WTRU-specific parameter. As used herein, control channel element (CCE), ECCE and NB-IoT control channel element (NCCE) may be used interchangeably.

Figure 3:
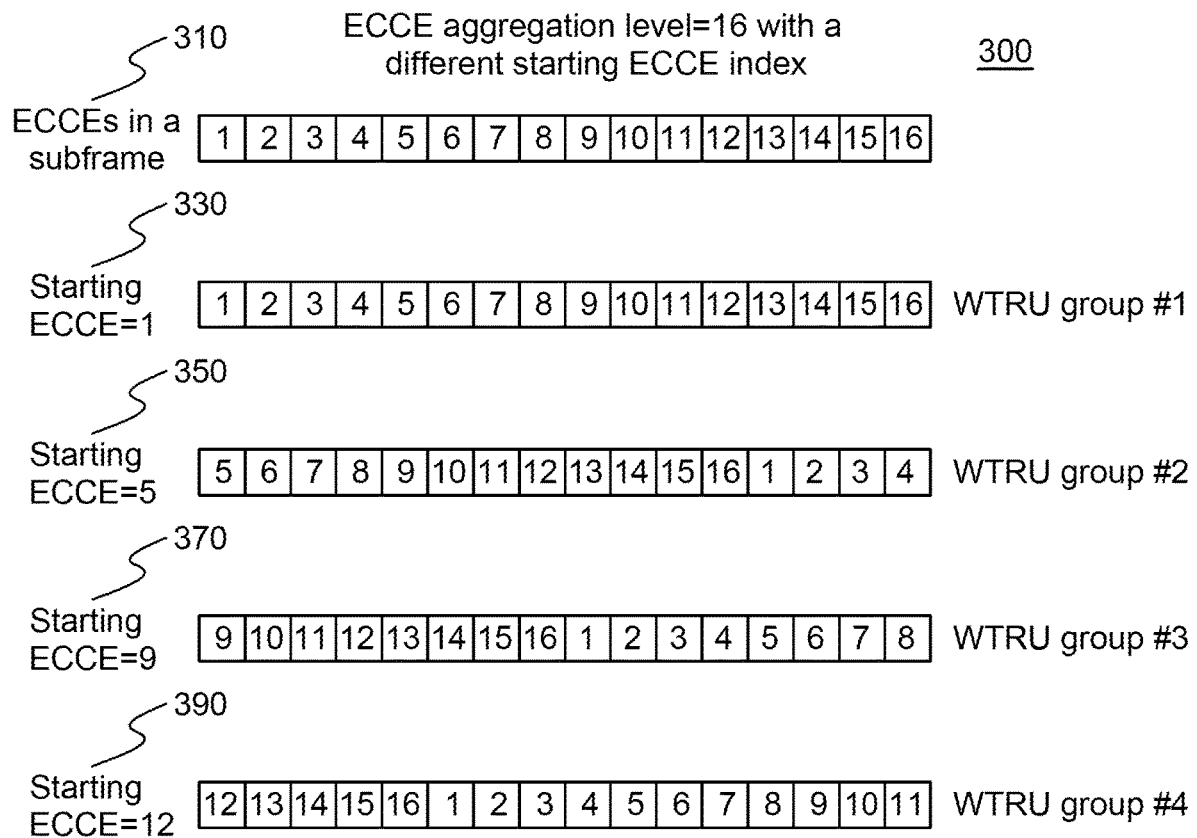
FIG. 3 is an exemplary diagram which illustrates WTRU group-specific starting enhanced control channel element (ECCE) indexes.

FIG. 3 is an exemplary diagram which illustrates WTRU group-specific starting ECCE indexes. Diagram 300 shows an example of ECCEs in a subframe 310 at ECCE aggregation level 16. In other examples, other ECCE aggregation levels such as 1, 2, 4, 8 and 32 may be used. In an example shown in FIG. 3, a WTRU may use a different starting ECCE index depending upon the group the WTRU is in. For example, the WTRUs may be divided among four WTRU groups, numbered WTRU group #1 through WTRU group #4. WTRUs in WTRU group #1 may use a starting ECCE index 330 with a starting ECCE of 1, WTRUs in WTRU group #2 may use a starting ECCE index 350 with a starting ECCE of 5, WTRUs in WTRU group #3 may use a starting ECCE index 370 with a starting ECCE of 9, and WTRUs in WTRU group #4 may use a starting ECCE index 390 with a starting ECCE of 12.

Figure 4:
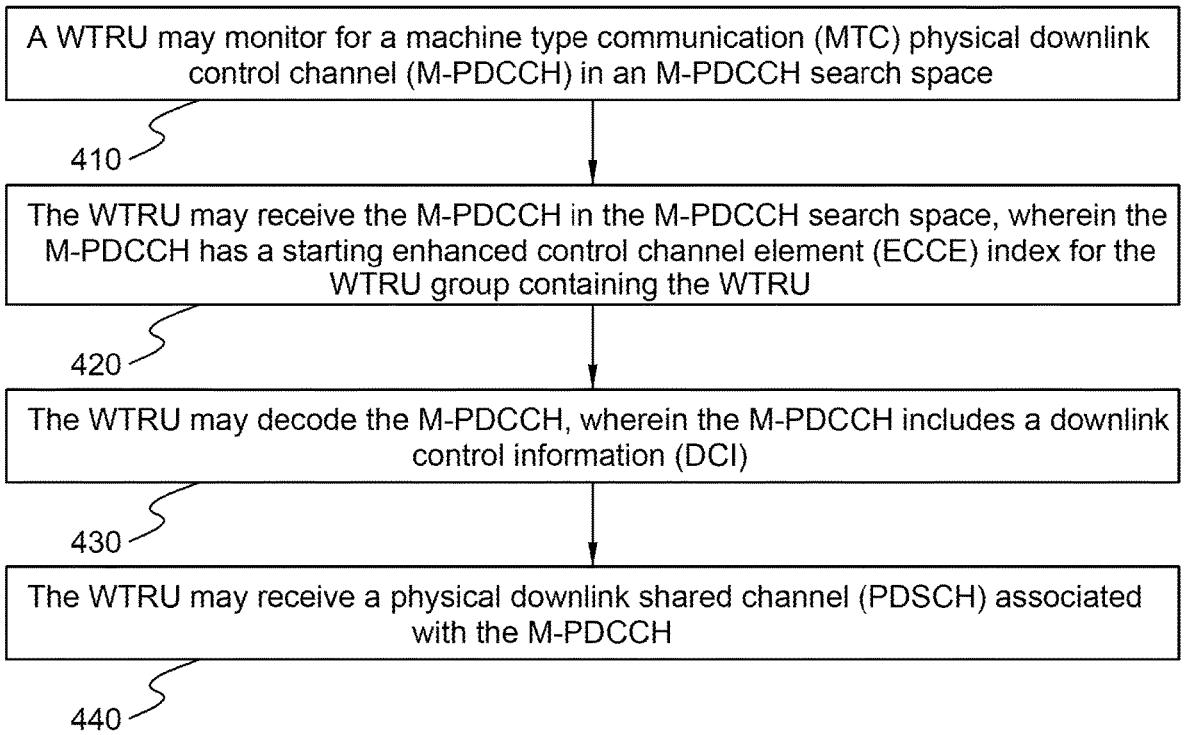
FIG. 4 is a diagram of an example flow chart showing a WTRU receiving a machine type communication (MTC) physical downlink control channel (M-PDCCH) with a starting ECCE index based on the WTRU group of the WTRU.

FIG. 4 is a diagram of an example flow chart showing a WTRU receiving a machine type communication (MTC) physical downlink control channel (M-PDCCH) with a starting ECCE index based on the WTRU group of the WTRU. In an example shown in chart 400, a WTRU may monitor for an M-PDCCH in an M-PDCCH search space 410. The WTRU may monitor for the M-PDCCH using a starting ECCE index for the WTRU group containing the WTRU. The WTRU may then receive the M-PDCCH in the M-PDCCH search space, wherein the M-PDCCH may have a starting ECCE index for the WTRU group containing the WTRU 420. In an example corresponding to the WTRU groups shown in FIG. 3, the WTRU may be in WTRU group #2 and may therefore monitor for and/or receive an M-PDCCH with a starting ECCE index 350 of 5. Further, the WTRU may decode the M-PDCCH, wherein the M-PDCCH includes a DCI 430. The WTRU may receive a PDSCH associated with the M-PDCCH 440 or the DCI, for example a PDSCH scheduled by the M-PDCCH or the DCI. In an example, the WTRU may receive, decode, attempt to decode, demodulate, and/or attempt to demodulate the PDSCH based on the DCI, wherein the PDSCH may include a paging message. As a result, the WTRU may change its operation based on the paging message. For example, the WTRU may change from idle mode to connected mode based on the paging message. The WTRU may then begin to transmit and receive in connected mode. In another example, the WTRU may already be in connected mode and may change its system operation based on system information change information in the page message.

In another example, an M-PDCCH search space may be used for a DCI monitoring, where the starting ECCE index and ordering (for example, an ascending order, a descending order, a random order and/or a predefined order) may be used to determine an M-PDCCH candidate. For example, if a number of ECCEs, $N_{ECCE}$, is available in the search space and an ECCE aggregation level is the same as $N_{ECCE}$ for an M-PDCCH candidate, one or more M-PDCCH candidates may be determined based on the starting ECCE index and/or ordering.

An M-PDCCH candidate may be defined or configured with $N_{ECCE}$ ECCEs which may be aggregated in an ascending order, descending order, ascending order with a starting ECCE index, or descending order with a starting ECCE index. In an example, the starting ECCE index and/or ordering may be determined based on at least one WTRU-specific parameter. In a further example, the starting ECCE index and/or ordering may be determined based on at least information type carried in the DCI.

In another example, an M-PDCCH search space may be used for a DCI monitoring, where the ECCE aggregation may be based on a sequence. The sequence for the ECCE ordering may be determined based on at least one WTRU-specific parameter.

Figure 5:
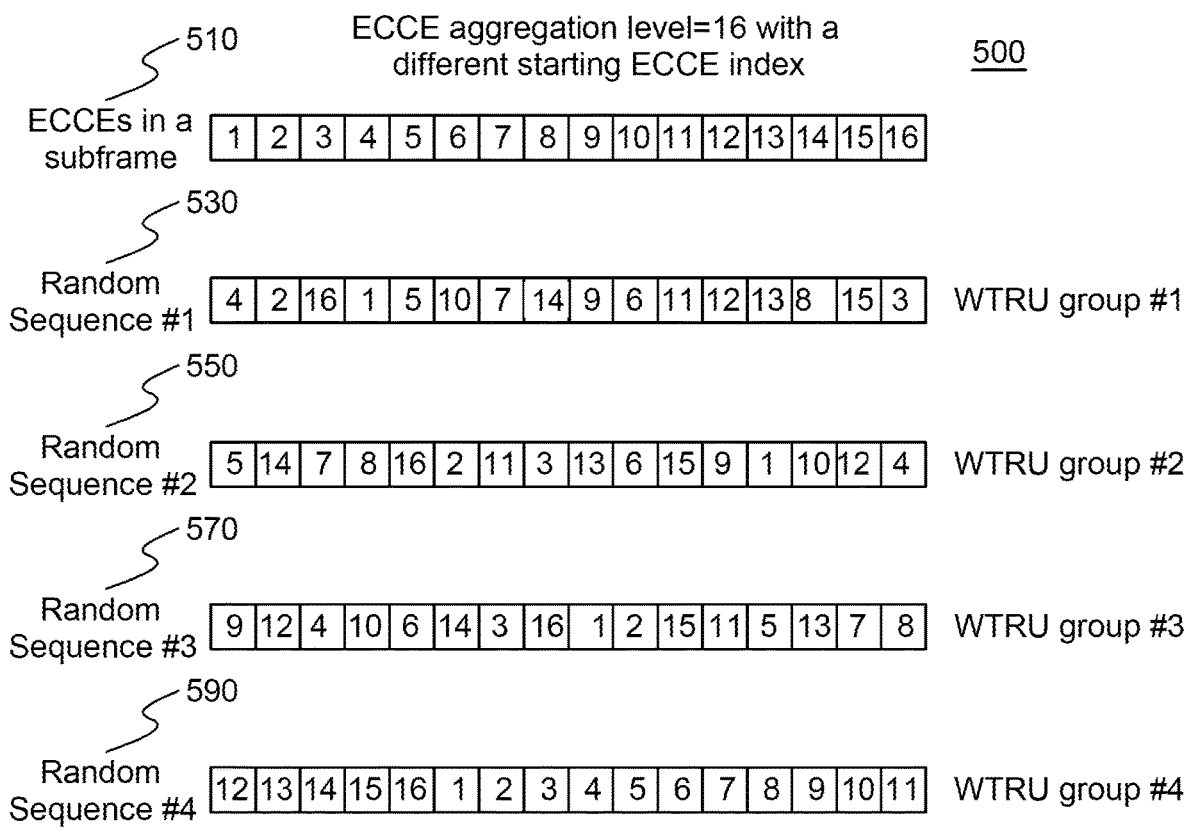
FIG. 5 is an exemplary diagram which illustrates WTRU group-specific random ECCE ordering.

FIG. 5 is an exemplary diagram which illustrates WTRU group-specific random ECCE ordering. A sequence for the ECCE ordering may be determined based on at least one WTRU-specific parameter as shown in diagram 500. Similar to FIG. 3, FIG. 5 shows an example of ECCEs in a subframe 510, at ECCE aggregation level 16. In an example, a sequence may determine the ECCE ordering for ECCE aggregation. In a further example, the sequence for ECCE ordering may be determined based on at least one of: a WTRU-specific parameter, an information type carried in the DCI, an RNTI that may be used for CRC scrambling, a DCI format used and a CE level or repetition number such as, for example a repetition number of an M-PDCCH candidate.

In yet a further example, a set of random sequences may be predefined or configured, for example for a group of WTRUs. A sequence may correspond to a starting ECCE index. A sequence may correspond to ECCE aggregation ordering.

In an example shown in FIG. 5, a WTRU may use a different starting ECCE index depending upon a random sequence that may be defined, configured and/or used by or for the group the WTRU is in. For example, the WTRUs may be divided among four WTRU groups, numbered WTRU group #1 through WTRU group #4. WTRUs in WTRU group #1 may use a first random sequence 530 that may correspond to a starting ECCE index of 4, WTRUs in WTRU group #2 may use a second random sequence 550 that may correspond to a starting ECCE index of 5, WTRUs in WTRU group #3 may use a third random sequence 570 that may correspond to a starting ECCE index of 9, and WTRUs in WTRU group #4 may use a fourth random sequence 590 that may correspond to a starting ECCE index of 12. A random sequence, for example, within the set, may be determined based on at least one of: a WTRU-specific parameter, an information type carried in the DCI, an RNTI that may be used for CRC scrambling, a DCI format used, or a CE level or repetition number, such as, for example, a repetition number of an M-PDCCH candidate.

Examples using a bit interleaver for M-PDCCH randomization are disclosed herein. In an example, a bit sequence for an M-PDCCH may be interleaved with an interleaving sequence. The interleaving sequence may be a sequence with the length of the bit sequence. The bit positions may be interleaved based on the interleaving sequence. In an example, the interleaving sequence may be determined based on one or more of at least one WTRU-specific parameter, an information type carried in the DCI, an RNTI that may be used for CRC scrambling, a DCI format used, and a CE level or repetition number such as, for example a repetition number of an M-PDCCH candidate. In a further example, a WTRU may use the interleaving sequence to de-interleave the received bit sequence before it may attempt to decode the received bit sequence.

In an example, one or more RNTIs may be used for a DCI, for example to indicate to a WTRU whether to decode an associated PDSCH. For example, a cell-specific P-RNTI and one or more WTRU group specific P-RNTIs may be used. A WTRU may attempt to decode the M-PDCCH with the cell-specific P-RNTI and/or an associated WTRU group specific P-RNTI in a PO. In an example, a first P-RNTI may be used for a DCI carrying a first information type. In a further example, a second P-RNTI may be used for a DCI carrying a second information type. Also, in a PO, a WTRU may attempt to decode a DCI with the first P-RNTI and/or the second P-RNTI.

A first P-RNTI may be used for a DCI carrying a first information type. The first P-RNTI may be a cell-specific P-RNTI. The first information type may include but not be limited to at least one or more system information update indications such as a system information modification indication, an ETWS indication, a CMAS indication, and an EAB parameter modification indication. One or more system information indications may be a single bit to indicate the system information update or multiple bits to indicate the system information update of multiple SIs, such as, for example, SIBs or SI-messages. An additional indicator may be included, such as, for example a flag bit to indicate a DCI format or a DCI type. The first P-RNTI may be based on at least one cell-specific parameter, such as, for example a physical cell-ID.

A second P-RNTI may be used for a DCI carrying a second information type. A set of P-RNTIs may be predefined or configured for the second P-RNTI and one of the predefined or configured P-RNTIs may be determined in a WTRU-specific or a WTRU group specific manner. A modulo operation with a WTRU-ID and/or the number of P-RNTIs configured may be used to determine the associated P-RNTI. A hashing function may be used with a WTRU-ID and/or the number of P-RNTIs configured to determine the associated P-RNTI.

In a PO, a WTRU may attempt to decode a DCI with the first P-RNTI. The WTRU may also attempt to decode a DCI with the second P-RNTI which may be associated with the WTRU. If a WTRU may successfully decode a DCI with the first P-RNTI, then the WTRU may not monitor a DCI with the second P-RNTI. If a WTRU may not successfully decode a DCI with the second P-RNTI, then the WTRU may assume that the associated PDSCH may not be scheduled.

An explicit indication of paging reception is disclosed herein including the use of: a paging occasion type; a monitoring indicator for a paging occasion, a paging type, a paging message, a paging window, among others; multiple monitoring indicators; and multiple monitoring indicators with explicit and implicit indications. In examples, one or more paging occasion types may be used, configured, or defined, for example for a RRC idle WTRU and/or a RRC connected WTRU.

A first paging occasion type may be used for a paging message transmission in which a WTRU may monitor for a paging message. The paging message may include one or more paging records and/or one or more system information update indications. In an example, the paging message may be carried in a DCI. In a further example, the paging message may be carried in a PDSCH and the scheduling information of the PDSCH may be provided in an associated DCI. Also, the paging message may be carried in a PDSCH without an associated DCI for the scheduling information. Further, the contents of the paging message may be indicated from the associated DCI. For example, a DCI may indicate the information type included in the paging message.

In an example, a second paging occasion type may be used for one or more system information update indications. In a further example, one or more paging occasion types may be located in a same time/frequency resource and monitored separately.

The time/frequency locations for one or more paging occasion types may be determined independently. A time/frequency location of a first paging occasion type may be determined based on at least one WTRU-specific parameter, such as, for example, a WTRU-ID. A time/frequency location of a second paging occasion type may be determined based on at least one cell-specific parameter, such as, for example, a physical cell-ID, (e)DRX cycle, system bandwidth and the like.

In an example, a DCI format or DCI contents may be different according to the paging occasion type. Further, an associated RNTI may be different according to the paging occasion type.

In an example, an indication for monitoring, for example, a monitoring indicator, of one or more of PO types may be transmitted in a broadcast channel, such as, for example, in a MIB, in a DCI in common search space and the like. For example, a broadcast channel may be transmitted in every x ms and one or more POs may be associated with a broadcast transmission. The broadcast transmission may indicate if a WTRU may need to monitor one or more POs associated with the broadcast transmission. A WTRU may attempt to decode or read a broadcast channel which may carry the monitoring indicator before it may monitor one or more POs. In an example, a monitoring indicator may be associated with one or more PO types. For example, the monitoring indicator may be associated with a first PO type. In a further example, the monitoring indicator may be associated only with a first PO type. In another example, the monitoring indicator may be associated with a second PO type. In a still further example, the monitoring indicator may be associated only with a second PO type. In an example, the monitoring indicator may be set to TRUE or FALSE. Based on the monitoring indicator, a WTRU may monitor a WTRU-group specific PO which may be determined based on at least one of a WTRU-specific parameter, such as, for example a WTRU-ID, or a cell-specific PO that may be determined based on at least one cell-specific parameter, such as, for example, a physical cell-ID.

A monitoring indicator may be associated with one or more POs. For example, a monitoring indicator may be associated with POs within a certain time window. If a WTRU receives the monitoring indicator, the WTRU may attempt to receive or monitor POs within the certain time window.

A monitoring indicator may indicate a WTRU group index and a WTRU group associated with the monitoring indicator may monitor the POs. In an example, the monitoring indicator may indicate which WTRU group may need to monitor POs. The WTRU group may include all WTRU groups for a system information update. In another example, the monitoring indicator may have a number of states, such as four states and may indicate at least one of the states. The states may, for example include cell common paging, a first WTRU group, a second WTRU group, and a third WTRU group. In an example, the cell common page may be or occur in a cell-specific PO. A WTRU may monitor a PO or monitor for a page according to a monitoring indicator state.

A monitoring indicator may indicate a PO type and a WTRU may monitor POs corresponding to the PO type. In an example, a WTRU may receive a monitoring indicator which indicates a first PO type, and then the WTRU may monitor POs corresponding to the first PO type. Further, a WTRU may receive a monitoring indicator which indicates a first PO type, and then the WTRU may monitor POs corresponding to the first PO type only.

In another example, a monitoring indicator may be used with a WTRU group specific M-PDCCH scrambling sequence, a WTRU group specific RNTI, a WTRU group specific starting ECCE index, and/or a WTRU group specific interleaver. A monitoring indicator may be used to indicate if a WTRU may need to monitor POs associated with it and an implicit indication of paging reception schemes may be used in each PO. A WTRU may, for example, attempt to decode, receive, or monitor the monitoring indicator and, if the monitoring indicator indicates that the WTRU may need to monitor the POs, the WTRU may attempt to decode or monitor the POs, for an M-PDCCH, for example, with its associated scrambling sequence, starting ECCE index, RNTI, and/or interleaving sequence. Further, a WTRU may first attempt to decode, receive, or monitor the monitoring indicator and, if the monitoring indicator indicates that the WTRU may need to monitor the POs, the WTRU may attempt to decode or monitor the POs, for an M-PDCCH, for example, with its associated scrambling sequence, starting ECCE index, RNTI, and/or interleaving sequence.

In an example, one or more monitoring indicators may be used and a WTRU may determine if the WTRU may need to monitor, receive, or attempt to decode an M-PDCCH and/or a PDSCH carrying paging related information. A monitoring indicator may be used to determine if a WTRU needs to monitor or attempt to decode a M-PDCCH in a PO, which may be referred to as a PO (paging occasion) monitoring indicator. A monitoring indicator may be used to determine if a WTRU needs to receive an associated PDSCH which may carry a paging message (PM), which may be referred to as a PM monitoring indicator. A monitoring indicator may be used to determine if a WTRU needs to monitor POs within a paging window (PW), which may be referred to as a PW monitoring indicator. A PW may include one or more POs for a WTRU. A PW may be defined or determined based on a number of POs. For example, a PW may be defined to include $N_{PO}$ POs where $N_{PO}$ may be a positive integer number.

A monitoring indicator may be used to determine if a WTRU needs to receive, attempt to decode, or monitor a subsequent monitoring indicator. A WTRU may receive a monitoring indicator before it may decode, monitor, attempt to decode, receive, or attempt to receive a signal, for example an M-PDCCH or a PDSCH, in a PO. Two monitoring indicators may be used and a first monitoring indicator may be a PO monitoring indicator and a second monitoring indicator may be a PM monitoring indicator. The first monitoring indicator may be transmitted in a broadcast channel. The second monitoring indicator may be transmitted in a DCI, for example in an M-PDCCH.

A PM monitoring indicator may be comprised of one or more bits to indicate at least one of the following: a presence of an associated PDSCH which may carry a paging message; a WTRU group index, or WTRU group ID, which may be associated with a paging message; and a type of information carried in a paging message.

In another example, one or more monitoring indicators may be used and each monitoring indicator may be used to indicate a WTRU group, a WTRU group index or a WTRU group ID. A WTRU which may be associated with a WTRU group, a WTRU group index or a WTRU group ID may need to monitor or receive a paging message, for example when a monitoring indicator for the WTRU group, the WTRU group index or the WTRU group ID indicates to monitor or read a paging message. A hierarchical WTRU group index may be used, where a first WTRU group index may include a set of WTRUs or WTRU-IDs and a second WTRU group index may include a subset of WTRUs or WTRU-IDs within the set of WTRUs or WTRU-IDs indicated from the first WTRU group index. The first WTRU group index may be determined based on a WTRU-ID, for example, IMSI, and the second WTRU group index may be determined based on a different WTRU-ID, for example, s-TMSI. The first WTRU group index may be determined based on a modulo operation based on WTRU-ID and the number of WTRU groups for the first WTRU group index, and the second WTRU group index may be determined based on a hashing function with a WTRU-ID and the number of WTRU groups for the second WTRU group index.

A combination of a first monitoring indicator and a second monitoring indicator may be used to determine a WTRU group index. If N1 WTRU groups for a first monitoring indicator and N2 WTRU groups for a second monitoring indicator are used, the combined WTRU group may be indicated as N1×N2 WTRU groups.

Examples of using multiple monitoring indicators for paging with explicit and implicit indications are discussed herein. In an example, one or more monitoring indicators may be used and a first monitoring indicator may be based on one or more explicit bits while a second monitoring indicator may be based on an RNTI. For example, a WTRU may receive or receive an indication from a PO monitoring indicator in a first channel and the WTRU may receive or receive an indication from a PM monitoring indicator in a second channel.

In an example, the first channel may be a broadcast channel and the second channel may be a physical downlink control channel, for example, an M-PDCCH. In another example, the first channel may be an M-PDCCH monitored in a cell-specific time/frequency resource, such as, for example, a common search space, and the second channel may be an M-PDCCH monitored in a WTRU-specific or WTRU-group specific time/frequency resource, such as, for example, a WTRU-specific or WTRU group-specific search space. In a further example, the PO monitoring indicator may be one or more bits transmitted in a broadcast channel. Also, the PM monitoring indicator may be a set of RNTIs reserved for the PM monitoring indication.

Example methods for a WTRU to perform a paging NB determination are discussed herein. A WTRU may determine the NB to use for paging in its PO, for example based on at least one of its WTRU ID, the number of paging NBs, and the DL system bandwidth. The WTRU ID may be an IMSI or an s-TMSI. An option is to use IMSI modulo 1024 to determine the NB, for example, since IMSI modulo 1024 may be used to determine the WTRU's PO. The number of paging NBs may be broadcast, may be received via broadcast signaling, and/or may be received via system information. A paging NB may be a NB that may be used for paging.

In an example, a NB may be or may represent a set of RBs or subcarriers within a system BW.

The parameters used for paging may include DRX cycle, nB and the like. Depending on the parameters that may be used for paging and the number of NBs, the use of IMSI modulo 1024 to determine the NB, however, may result in some or all WTRUs in a given PO determining the same NB. This may defeat the purpose of having multiple NBs for paging.

Several example solutions are discussed herein for a WTRU to better determine a NB for paging. In an example solution, IMSI-10 may be used to represent IMSI modulo 1024 or the least significant 10 bits of an IMSI. For MME initiated paging of a WTRU, the MME may include the IMSI-10 and/or the s-TMSI for the WTRU in the S1 paging message to the eNode-B to request the page. When paging a WTRU, an eNode-B may know the IMSI-10 and/or the s-TMSI of the WTRU. The WTRU and/or eNode-B may use one or both of these values to determine the WTRU's NB for paging. For example, the WTRU and/or eNode-B may use one or both of these values to determine the WTRU's NB for paging in the WTRU's PO.

A function, such as a hashing function, that may be based on at least the WTRU ID may be used by a WTRU and/or eNode-B to determine the NB for paging. For example, the function may be based on at least IMSI-10 or IMSI modulo X. In an example, the hashing function may be based on at least IMSI-10 or IMSI modulo X.

For example, a function such as a hashing function may be used based on $N_b$ and/or the WTRU ID. In an example, $N_b$ may be the number of NBs. In a further example, $N_b$ may be the number of NBs to use for paging or that may be used for paging. For example, the NB for a WTRU, $NB_{WTRU}$, may be determined, for example, by the WTRU and/or eNode-B according to:

$$NB_{WTRU} = (A \cdot N_{WTRUID}) N_b \quad \text{Equation (1)}$$

where the A may be a prime number, for example, A=39827. In a further example, $NB_{WTRU}$, may be determined according to:

$$NB_{WTRU} = ((A \cdot N_{WTRUID}) \bmod D) \bmod N_b \quad \text{Equation (2)}$$

where D may be a prime number which may be different from A, for example, D=65537.

A and/or D may be a function of $N_b$. A and/or D may be fixed and/or configured, for example, by the eNode-B via signaling. $N_{WTRUID}$ may be the WTRU ID or a portion of or function of the WTRU's IMSI or s-TMSI. For example $N_{WTRUID}$ for a WTRU may be IMSI-10, IMSI modulo X, where X may be a number less than or equal to 1024 or IMSI modulo Y, where Y may be a number less than or equal to 16,384. The number of NBs for paging may be provided by the eNode-B and/or received by the WTRU in signaling such as higher layer signaling which may be broadcast, for example, in system information.

Additional IMSI bits or an additional portion or function of the IMSI may be used by a WTRU and/or eNode-B to determine the NB for paging. The MME may include the additional bits in the S1 paging message to the eNode-B. The eNode-B may receive the additional bits and may use them to determine the NB in which to page the WTRU.

For example, the most significant B bits of IMSI modulo Z may be used to determine the NB for paging, where Z may be at least one of $(2^B) \times 1024$, $(2^C) \times 1024$ and a number less than or equal to 16,384. In an example, C may be a number or integer that may be different than B. Further, the B MSBs, for example the value of the B MSBs, MB, may be used to determine the NB, for example according to MB modulo $N_b$.

In an example, if there are up to 16 narrowbands for paging, B may be 4. The 4 MSBs of IMSI modulo 16,384 may be used to determine the NB for paging, where IMSI modulo 16,384 may be derived from IMSI modulo Z and $Z=(2^B) \times 1024$. Since B may be 4, then $(2^B) \times 1024 = 16 \times 1024 = 16,384$. Further, since B may be 4, the 4 MSBs, M4, may be used to determine the NB, for example according to M4 modulo $N_b$. M4 may be used to represent the 4 MSBs or the value of the 4 MSBs.

In another example, B may be 3 and C may be 4. The 3 MSBs of IMSI modulo 16,384 may be used to determine the NB for paging, where IMSI modulo 16,384 may be derived from IMSI modulo Z and $Z=(2^C) \times 1024$. Since C may 4, then $(2^B) \times 1024 = 16 \times 1024 = 16,384$. Further, since B may be 3, the 3 MSBs, M3, may be used to determine the NB, for example according to M3 modulo $N_b$. M3 may be used to represent the 3 MSBs or the value of the 3 MSBs.

In other examples, different numbers of narrowbands for paging may be used and still be consistent with the examples discussed herein. Further, in other examples, different values for B, for C or for both may be used.

The 14 bits, IMSI-14, that may correspond to IMSI modulo 16,384 may be used to determine the NB, for example according to IMSI-14 modulo $N_b$. Further, the 14 bits, IMSI-14, that may correspond to IMSI modulo 16,384 may be used to determine the NB, for example according to IMSI-14 modulo $N_b$ modified by one or more other parameters.

Figure 6:
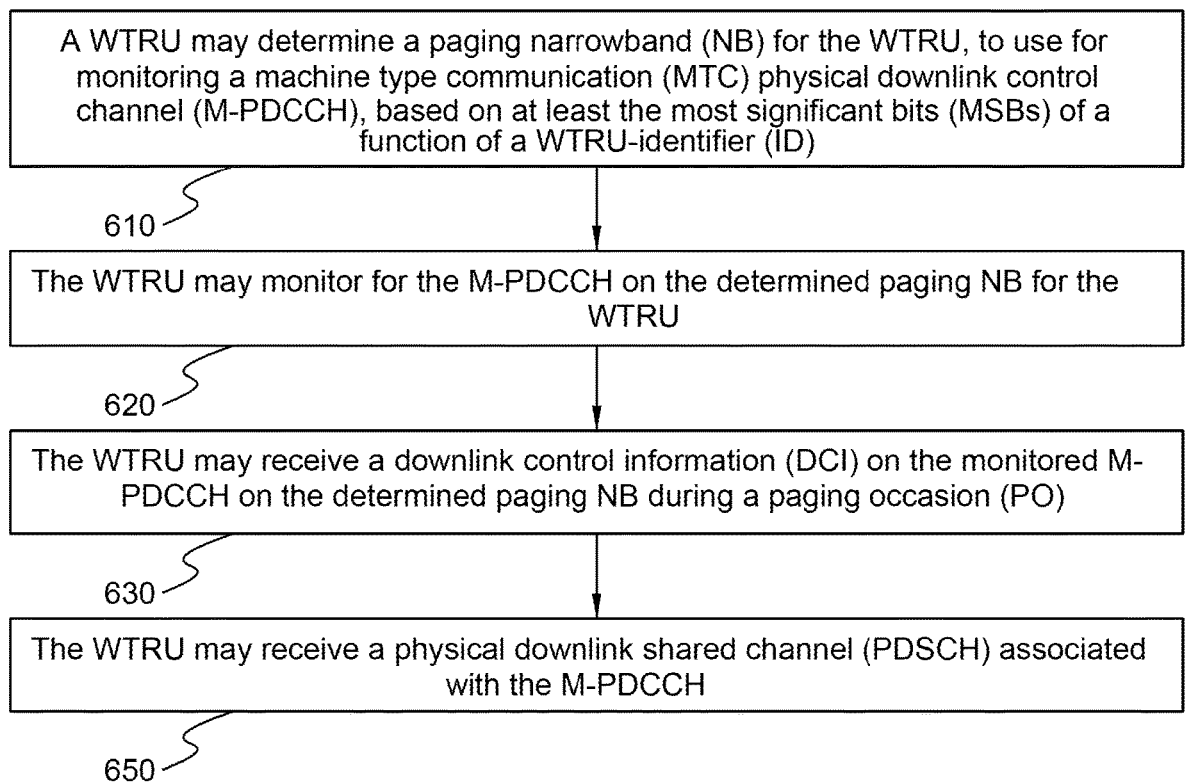
FIG. 6 is a diagram of an example flow chart showing a WTRU using a WTRU-ID to determine a paging narrowband (NB) to use for monitoring an M-PDCCH.

FIG. 6 is a diagram of an example flow chart showing a WTRU using a WTRU-ID to determine a paging NB to use for monitoring an M-PDCCH. As shown in flow chart 600, a WTRU may determine a paging NB for the WTRU, to use for monitoring an M-PDCCH, based on at least the MSBs of a function of a WTRU-ID 610. The WTRU may monitor for the M-PDCCH on the determined paging NB for the WTRU 620. For example, the WTRU may monitor for the M-PDCCH on the determined paging NB in or during a PO that may be a PO of the WTRU. The WTRU may monitor for an M-PDCCH masked with a P-RNTI or for an M-PDCCH or DCI with a CRC scrambled with a P-RNTI. The WTRU may then receive a DCI on the monitored M-PDCCH on the determined paging NB during a PO 630 that may be a PO of the WTRU. The DCI may include a CRC that may be scrambled with a P-RNTI. The WTRU may receive a physical downlink shared channel (PDSCH) associated with the M-PDCCH 650 or the DCI, for example a PDSCH scheduled by the M-PDCCH or the DCI. The WTRU may receive system information update related information and/or a paging message in or from the DCI or the PDSCH.

In a further example, the most significant N bits of IMSI-10 may be used to determine the NB for paging. N may be a function of the number of NBs configured or available, for example, in a PO, for paging.

In the embodiments and examples described herein, the term mobile subscriber identification number (MSIN) may be substituted for IMSI and vice versa and still be consistent with embodiments and examples disclosed herein. Further, various example numbers of digits may be used for MSIN and IMSI, including but not limited to 8, 10, 14, 16, 32, 64 and the like.

Examples of a WTRU determining a paging HF are discussed herein. Within a PH, WTRUs with the same IMSI modulo 1024 may determine the same PF and the same PO.

Depending on the paging parameters, WTRUs may not be distributed well among the PFs and the PO.

IMSI may be comprised of decimal digits (0 through 9) and may include one or more of mobile country code (MCC), mobile network code (MNC) and MSIN. An IMSI may use binary-coded decimal (BCD) representation. IMSI may comprise 64 bits where each digit may by coded over 4 separate bits. The digits 0 to 9 may be encoded 0000 to 1001 and there may be two digits per octet. For the function IMSI modulo X, IMSI may be the decimal representation of the IMSI, the BCD representation of the IMSI, the hexadecimal representation of the IMSI, or another representation of the IMSI.

One or more of the examples described herein for the determination of a paging NB, for example, for and/or by a WTRU, may be applied to the determination of one or more of PH, PF, and PO, for example, for and/or by a WTRU. A separate, for example, different function, aspect, or portion of the WTRU-ID, for example, IMSI or s-TMSI, may be used for each of PH and PF determination for and/or by a WTRU.

A $WTRU\_ID_{PH}$ may represent the function, aspect, or portion of the WTRU-ID that may be used in the PH calculation. $WTRU\_ID_{PF}$ may represent the function, aspect, or portion of the WTRU-ID that may be used in the PF calculation. $WTRU\_ID_{PH}$-10 may represent $WTRU\_ID_{PH}$ modulo 1024. $WTRU\_ID_{PF}$-10 may represent $WTRU\_ID_{PF}$ modulo 1024. For MME initiated paging of a WTRU, the MME may include $WTRU\_ID_{PH}$-10 and/or $WTRU\_ID_{PF}$-10 in the S1 paging message to the eNode-B to request the page.

A $WTRU\_ID_{PH}$-10 and/or the $WTRU\_ID_{PF}$-10 may be given to the eNode-B by the MME. A $WTRU\_ID_{PH}$-10 and/or the $WTRU\_ID_{PF}$-10 may be given to the eNode-B by the MME as a bit string of size 10. The bits may follow the normal binary representation or the BCD representation.

When paging a WTRU, an eNode-B may know $WTRU\_ID_{PH}$-10 and/or $WTRU\_ID_{PF}$-10. The WTRU and/or eNode-B may use one or both of these values to determine the WTRU's PH and/or PF. The WTRU and/or eNode-B may use $WTRU\_ID_{PH}$-10 to determine the WTRU's PH or PHs for paging. The WTRU and/or eNode-B may use $WTRU\_ID_{PF}$-10 to determine the WTRU's PF or PFs for paging.

In an example, $WTRU\_ID_{PH}$ may be the WTRU's MSIN. MSIN may be the least N1, for example, 9, significant decimal digits of the IMSI in decimal representation, for example, if the concatenation of MCC and MNC is 6 digits. MSIN may be the least N2, for example, 10, significant decimal digits of the IMSI, for example, if the IMSI is 15 digits. $WTRU\_ID_{PF}$ may be the WTRU's IMSI. $WTRU\_ID_{PH}$-10 may be MSIN modulo 1024 and/or the $WTRU\_ID_{PF}$-10 may be IMSI modulo 1024.

In another example, $WTRU\_ID_{PH}$ may be the IMSI and $WTRU\_ID_{PF}$ may be the MSIN. In another example, if the concatenation of the MCC and MNC part of the IMSI is an even number, the IMSI may be transformed such that the concatenation of the MCC and the MNC part of the IMSI is an odd number. For example, one may be added or subtracted from the concatenation of the MCC and MNC part of the IMSI.

In another example, MSIN-10Q may be used to represent FLOOR [MSIN/1024] or (FLOOR [MSIN/1024]) modulo 1024. $WTRU\_ID_{PH}$-10 may be MSIN-10Q.

Modified paging reception examples are disclosed herein. In an example, a WTRU may determine its PH, PF, and PO according to a set of rules, such as, for example, regular rules. The WTRU may receive and/or use additional configuration or information to determine when to monitor or skip monitoring for paging, for example, when to monitor or skip monitoring for a M-PDCCH masked with a paging RNTI, and/or receive or skip receiving an associated PDSCH or PCH.

At least some of the configuration and/or information may be provided by or received from an MME via NAS signaling or via an eNode-B via RRC signaling. The WTRU may maintain the configuration and/or information while in idle mode. A WTRU may monitor for paging in the PFs of its PW in one PH per I-eDRX cycle. In an example, a WTRU may be configured to skip its PH in one or more I-eDRX cycles and/or to skip one or more PFs in its PW.

In an example, whether the WTRU ID is an odd or even number may be used to determine whether a WTRU may read or receive, or may skip reading or receiving, a page in a PF and/or a PH. Reading and/or receiving a page may correspond to monitoring for M-PDCCH with a paging RNTI. Reading and/or receiving a page may correspond to receiving, decoding, and/or reading a PDSCH which may be associated with, indicated by, or allocated by an M-PDCCH with a paging RNTI. Reading and/or receiving a page may correspond to receiving, decoding, and/or reading a PDSCH that may carry a paging message. Skipping reading or receiving a page may be the same as not reading or receiving or not attempting to read or receive a page. Skipping reading or receiving a page may be the same as skipping one or more of a PO, PF or a PH.

A WTRU may read or monitor for a page, for example, in a PO, if WTRU ID is an odd number and skip reading or monitoring for a page, for example, in a PO, if WTRU ID is an even number, for example if reading and/or monitoring by a WTRU with an odd number WTRU ID is indicated. A WTRU may read or monitor for a page, for example, in a PO if the WTRU ID is an even number and skip reading or monitoring for a page, for example, in a PO if WTRU ID is an odd number, for example if reading and/or monitoring by a WTRU with an even number WTRU ID is indicated.

$WTRU\_ID_{PH}$-10 and/or $WTRU\_ID_{PF}$-10 may be substituted for WTRU ID and still be consistent with this disclosure. WTRU ID may be IMSI modulo 1024, MSIN modulo 1024, and/or FLOOR [MSIN/1024], among others.

Whether odd numbered WTRUs or even numbered WTRUs may receive a page in a PF or PO may be determined based on one or more of: a WTRU ID odd/even indicator; a PH odd/even indicator; and/or a PF odd/even indicator.

One bit may be used for an indicator. One state of the bit may be used to indicate even and the other state may be used to indicate odd. 0 may be used for even and 1 for odd or vice versa. One or more of the indicators may be signaled, for example, by the eNode-B, for example in the MIB, in a SIB, or in the M-PDCCH for paging.

A WTRU may read one or more of the indicators prior to at least one of its PHs and/or PFs and/or POs. The WTRU may read one or more of the indicators in an M-PDCCH for paging in one of its POs. The WTRU may determine the state of one or more of the indicators and based on the state or states the WTRU may determine whether to monitor for a page and/or receive a PDSCH that may carry a page. An indicator in the MIB may be used by a WTRU to determine whether to monitor for a paging M-PDCCH in one or more POs. An indicator in the M-PDCCH for paging may be used by a WTRU to determine whether to reads a PDSCH associated with the M-PDCCH that may carry a paging message.

For example, for WTRU ID odd/even=even and PH odd/even=odd, a WTRU with an even WTRU ID may read or monitor for a page in, for example, only in, an odd numbered PH. The WTRU may skip reading or monitoring for a page in an even numbered PH. A WTRU with an odd WTRU ID may skip reading or monitoring for a page when WTRU odd/even is set to even, for example, in one or more, for example, both odd and even PHs.

In an example, (0,0) may mean the WTRU ID is even and PH is even, (1,0) may mean the WTRU ID is odd and PH is even, (0,1) may mean the WTRU ID is even and PH is odd, and (1,1) may mean the WTRU ID and PH are odd. The eNode-B may use one of these codes as a paging reading indicator, for example, at any time.

In another example, a single bit for odd/even WTRU ID may be used. A WTRU with an even WTRU ID may read or monitor for a page when WTRU odd/even is set to even and may skip reading or monitoring for a page when WTRU odd/even is set to odd. A WTRU with an odd WTRU ID may read or monitor for a page when WTRU odd/even is set to odd and may skip reading or monitoring for a page when WTRU odd/even is set to even.

The eNode-B may signal some or all of the bits of the current value of the paging reading indicator in the MIB, or in the SIB or in M-PDCCH (or PDCCH). The WTRU may make the determination to skip a PH based on the value of the paging indicator signaled by the eNode-B. The WTRU may make the determination to skip a PF based on the value of the paging reading indicator.

The eNode-B may use a paging reading indicator to indicate to one or more WTRUs to skip or read a page in a PH and/or PF. The eNode-B may use separate paging reading indicators to indicate to skip or read a page in a PF and to skip or read pages in all the PFs in a PH.

Odd/even indication may be replaced by a group ID that may represent another way to distinguish groups. More bits may be used as is appropriate. For example, there may be 4 groups and the least significant 2 bits of the WTRU ID may be used for the determination of which WTRUs may read or monitor for pages.

In a PO, multiple paging messages intended for multiple WTRUs may be multiplexed into a transport block and jointly coded by a channel coder, where the WTRUs may have a different coverage level, thus requiring repetitions targeting for a worst coverage case. This may result in resource waste for paging transmissions.

In an example, multiple paging messages may be separately coded as code-block segments within a PDSCH transmission. For example, a PDSCH, for example, an NB-PDSCH carrying one or more paging message(s) may be scheduled by an associated PDCCH, for example, an NB-PDCCH, in each PO. The paging messages multiplexed in the PDSCH may be split into one or more code-block segments.

Each code-block segment may be coded separately by a channel code, for example, a turbo code, convolutional code, or block code. Each code-block segment may be attached with a CRC. A code-block segment may be associated with one or more paging messages. A code-block segment may be associated with one or more coverage levels. A code-block segment may be associated with a WTRU-ID. The WTRU-ID used for PO determination and code-block segment determination may be different. For example, the PO may be determined based on a first WTRU-ID, for example, IMSI-10, while the code-block segment may be determined based on a second WTRU-ID, for example, s-TMSI.

Figure 7:
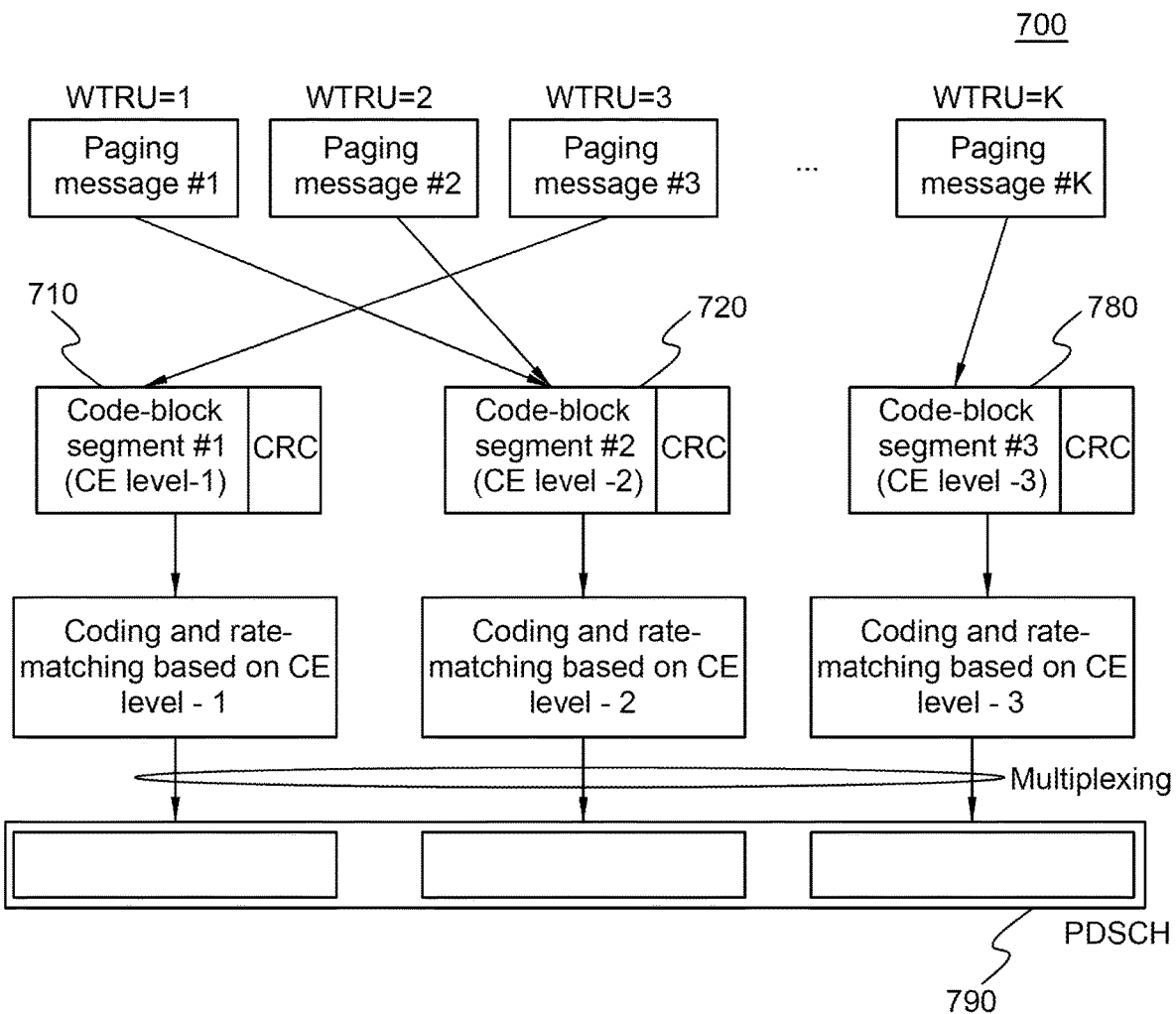
FIG. 7 is a diagram illustrating an example of code-block segment multiplexing in a physical downlink shared channel (PDSCH), which may be scheduled by an associated physical downlink control channel (PDCCH) in a paging occasion (PO)

FIG. 7 is a diagram illustrating an example of code-block segment multiplexing in a PDSCH which may be scheduled by an associated PDCCH in a PO. The paging message, paging information, and paging record may be used interchangeably. As shown in diagram 700, code-block segments 710, 720 and 780 may be each associated with one or more respective coverage levels or CE levels. For example, code-block segment 710 may be associated with CE level 1, code-block segment 720 may be associated with CE level 2 and code-block segment 780 may be associated with CE level 3.

A PDSCH carrying one or more paging messages may be transmitted over multiple subframes. The number of subframes used for the PDSCH transmission may be indicated from the associated PDCCH. The number of subframes for the PDSCH transmission may be determined based on the transport block size, where the transport block size may include all code-block segments multiplexed in the PDSCH. The number of repetitions may be indicated from the associated PDCCH. For example, the number of subframes Ns for the PDSCH transmission may be determined as a function of the transport block size and the number of repetitions Nrep may be indicated from the associated PDCCH. The total number of subframes used for the PDSCH transmission including repetitions may be Ns×Nrep.

A NB-subframe may include one of more subframes. The NB-subframe length may be determined based on the transport block size of the PDSCH transmission.

A code-block segment may be transmitted within an NB-subframe, where the NB-subframe length, for example, as a number of subframes, TTIs, ms, or the like, may be determined based on the size of the code-block segment. Multiple code-block segments may be multiplexed in a PDSCH. In an example shown in FIG. 7, code-block segments 710, 720 and 780 may be multiplexed in PDSCH 790. In an example, if Nc code-block segments are multiplexed in a PDSCH, the PDSCH may be transmitted over Nc NB-subframes. A NB-subframe length associated with a code-block segment may be determined based on the code-block segment size. The size of code-block segments may be indicated in the associated PDCCH. Based on the code-block segment sizes, a WTRU may determine the NB-subframe length of each code-block segment.

One or more code-block segments may be multiplexed in a PDSCH and the time/frequency resource locations for each code-block segment may be predefined. A WTRU may monitor all code-block segments within the PDSCH or a WTRU may monitor a subset of code-block segments. Each code-block segment may be associated with a CE level and a WTRU with a certain CE level may monitor, attempt to decode, or receive a code-block segment associated with the CE level. Each code-block segment may be associated with a WTRU-ID or a WTRU-group ID, and a WTRU may monitor, attempt to decode, or receive a code-block segment associated with the WTRU-ID or a WTRU-group ID.

In an example, multiple paging messages may be separately coded as code-block segments and each code-block segment may be transmitted in a PDSCH. For example, if Nc code-block segments are transmitted, the Nc PDSCHs may be transmitted and the Nc PDSCHs may be scheduled in an associated PDCCH in a PO. Each PDSCH carrying a code-block segment may be transmitted in one or more subframes. The starting subframe of each PDSCH carrying a code-block segment may be determined based on the last subframe of the associated PDCCH. Alternatively, the starting subframe of each PDSCH carrying a code-block segment may be determined based on the last subframe of the associated PDCCH and the size of the code-block segment. The number of subframes for a PDSCH carrying a code-block segment may be determined based on the size of the code-block segment. The size of the code-block segment may be a number of bits for the code-block segment after coding and rate-matching.

Figure 8:
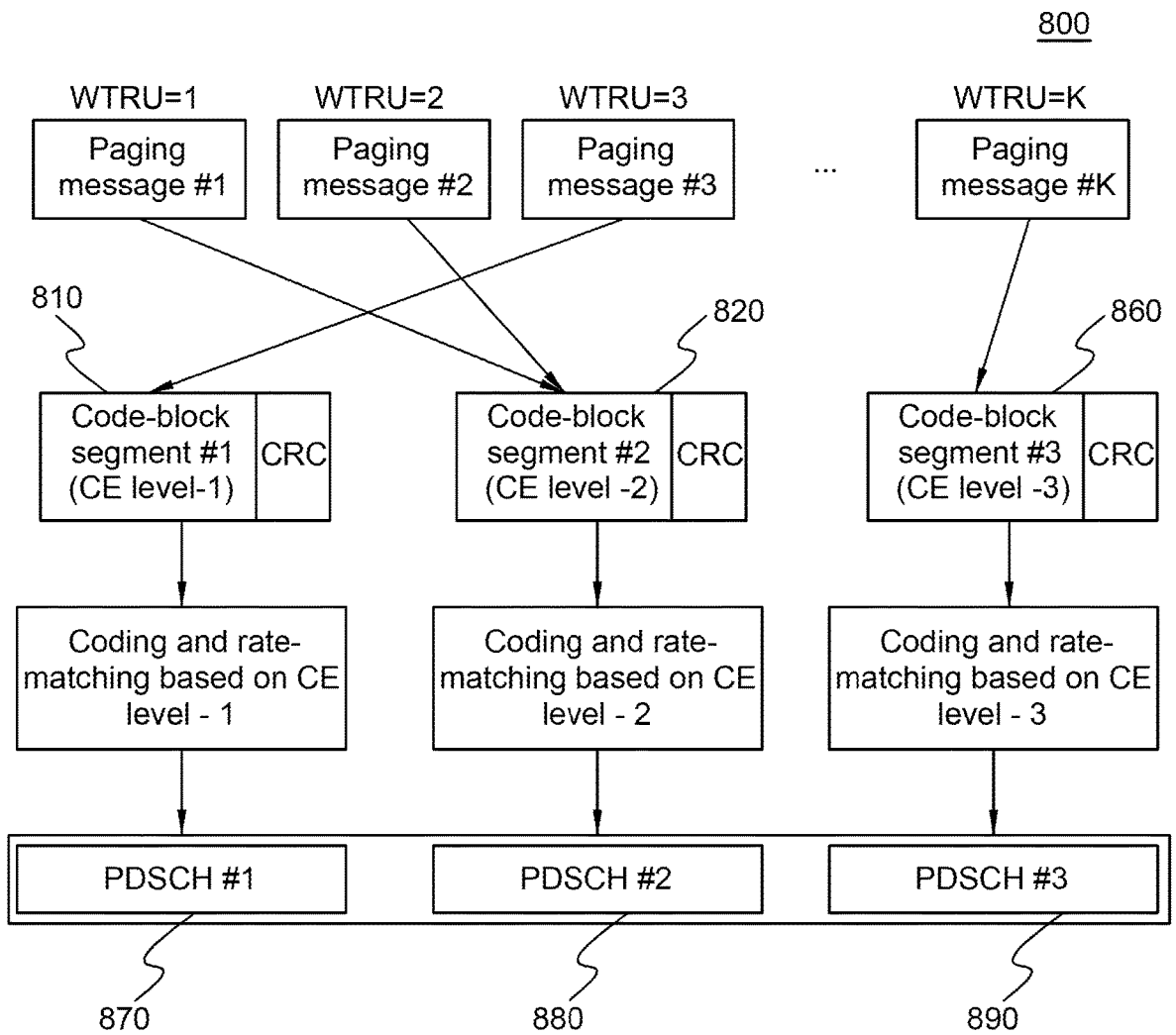
FIG. 8 is a diagram illustrating an example of code-block segments transmitted via multiple PDSCHs, which may be scheduled by an associated PDCCH in a PO.

FIG. 8 is a diagram illustrating an example of code-block segments transmitted via multiple PDSCHs which may be scheduled by an associated PDCCH in a PO. An associated PDCCH transmitted in a PO may schedule one or more PDSCHs carrying paging messages. A PDSCH may be associated with a code-block segment.

As shown in diagram 800, code-block segments 810, 820 and 860 may be each associated with one or more respective coverage levels or CE levels, in a manner similar to that in FIG. 7. For example, code-block segment 810 may be associated with CE level 1, code-block segment 820 may be associated with CE level 2 and code-block segment 860 may be associated with CE level 3. However, in FIG. 8, each different respective PDSCH may be associated with each different respective code-block segment. For example, code-block segment 810 may be associated with PDSCH 870, code-block segment 820 may be associated with PDSCH 880 and code-block segment 860 may be associated with PDSCH 890.

The PDSCHs may be multiplexed in the time domain. For example, the PDSCHs may be transmitted in a different time (e.g., different time window). The starting subframe of the PDSCHs may be predetermined based on the last subframe of the associated PDCCH.

In another example, the PDSCHs carrying code-block segments may be transmitted without an associated PDCCH. In each PO, one or more time windows may be configured, used, or allocated and a WTRU may attempt to decode, monitor, or receive a PDSCH carrying a code-block segment in a time window. The code-block segment size for a PDSCH may be predefined. One or more code-block segment sizes may be used and a WTRU may attempt to decode all candidate code-block segment sizes. The time windows for PDSCHs may be non-overlapped. Each time window may be associated with a CE level or WRTU-ID.

In another example, one or more PDSCHs carrying code-block segments may be transmitted and a first PDSCH may be scheduled by an associated PDCCH and the subsequent PDSCH(s) may be scheduled based on the previous PDSCH. An indication may be transmitted in a PDSCH to indicate whether a subsequent PDSCH carrying code-block segment may follow or may be transmitted. The indication may be based on a sequence masked in the CRC. For example, if the CRC is masked with a first sequence, there may not be a subsequent PDSCH while if the CRC is masked with a second sequence, there may be a subsequent PDSCH. The indication may be a bit transmitted in a code-block segment. A scheduling information may be transmitted with the indication. The first PDSCH may be based on the highest CE level, for example, a largest repetition number, and a subsequent PDSCH may be based on a lower CE level. The terms code-block segment and paging message may be interchangeably used herein.

The following examples include sending a direct indication in a paging DCI without PDSCH scheduling. When an eNode-B updates, or changes, a frequency location of an anchor RB, for example an anchor PRB, which may contain a synchronization signal and/or broadcasting signals such as a NB master information block (NB-MIB) and/or a NB-SIB, the eNode-B may need to indicate the update, or changes, via paging for WTRUs that are in RRC idle mode. If the indication bits are transmitted in a paging message, the resource overhead may be increased significantly since the eNode-B may need to send this signal in all POs.

In an example, a WTRU may monitor or attempt to decode a DCI located in a NB-PDCCH search space. The NB-PDCCH may be in a PO. The NB-PDCCH and/or the PO may be intended for the WTRU. The DCI may carry one or more information types. The terms information type and DCI contents may be used interchangeably herein. One or more of following example parameters may apply.

A first information type may be scheduling information of the associated PDSCH carrying a paging message. A second information type may be a direct indication which may be related to a system configuration. The second information type may not include scheduling information of the associated PDSCH.

The information type related to system configuration may include at least one of following parameters or indications: a system information update indication; a public warning indication, such as an ETWS or a CMAS indication; an access barring parameter, such as an EAB parameter modification indication; scheduling information of one or more SIBs, where one or more SIBs may be transmitted without an associated DL control channel (NB-PDCCH); configuration information related to the anchor RB, for example the anchor PRB, for NB-IoT; a same-physical cell-ID (PCI) indicator, which may indicate if the PCI for a cell-specific reference signal (CRS) port and the PCI for an NB reference signal (NB-RS) are the same; and a valueTag, which may include one or more bits to indicate which SIB or SIBs are updated.

The scheduling information of a SIB or SIBs may include at least one of the following parameters: transport block size (TBS), frequency location, frequency hopping related information, and coverage level, which may be, for example, a repetition number. As described herein, an anchor RB, for example an anchor PRB, may include or may include transmission of at least one of the following: a synchronization signal (for example, a NB primary synchronization signal (NB-PSS), a NB secondary synchronization signal NB-SSS and the like), a broadcast signal (for example, an NB physical broadcast channel (NB-PBCH), an NB-SIB and the like), and a NB-PDCCH common search space. The configuration information for an anchor RB, for example an anchor PRB, may include at least one of the following parameters: a RB location, for example a PRB location, within a system bandwidth, a raster offset, and a PCI of the NB-Sync.

In an example, the information type for the DCI may be determined based on a flag field in the DCI. For example, the flag field may indicate the information type carried. In another example, the information type for the DCI may be determined based on a RNTI used for the DCI. A first RNTI (e.g., P-RNTI-1) may be used if the DCI carries scheduling information of a corresponding PDSCH. A second RNTI (e.g., P-RNTI-2) may be used if the DCI carries direct information such as one or more indications related to a system configuration. In other examples, the information type for the DCI may be determined based on a scrambling sequence used for the DCI or a starting ECCE index used.

In examples, an eNode-B may page one or more WTRUs to indicate or provide a broadcast transmission or a multicast transmission. For example, for a downlink burst transmission to a group of WTRUs or all WTRUs in a cell, such as, for example, for or to perform a software upgrade of one or more NB-IoT devices, an eNode-B may page or may need to page the group of WTRUs or all WTRUs in the cell. For example, the eNode-B may need to page the group of WTRUs or all WTRUs in the cell if the WTRUs are in RRC idle. The eNode-B may need to transmit the downlink burst for each WTRU via WTRU-dedicated resources. This may result in inefficient resource utilization and WTRU battery consumption. A downlink burst transmission may be used herein as a non-limiting example of a broadcast or multicast transmission.

In an example, a common PO may be used for a downlink burst transmission. For example, a DCI scrambled with a certain RNTI, such as, for example, a downlink burst RNTI (DB-RNTI), may be monitored by a WTRU in a PDCCH search space in the common PO. The DCI may schedule a PDSCH carrying a downlink burst traffic.

A WTRU may monitor or attempt to decode the DCI in a PDCCH search space. The PDCCH search space may be located in a certain time/frequency resource configured or used for the common PO. The time/frequency resource for a common PO may be determined based on at least one of the following parameters: system parameters, such as, for example, system bandwidth, physical cell-ID, duplex mode, TDD subframe configuration; subframe number and/or radio frame number, for example SFN; WTRU-ID, such as, for example, full or partial information of IMSI, s-TMSI and the like; operation mode, such as, for example, in-band, guard-band, and stand-alone operation; one or more coverage levels, which may be represented by, for example, repetition numbers; WTRU category and/or WTRU capabilities; and paging NBs, which may be configured or determined.

The DCI may activate and/or deactivate the PDSCH transmission for downlink burst transmission. The PDSCH may be transmitted in predefined time/frequency resources. The predefined time/frequency resources may be transmitted with a duty cycle.

In an example, a scheduling information of the downlink burst may be transmitted in a broadcast channel or in system information, such as, for example, in a MIB or a SIB. A WTRU may receive an indication or may be indicated, triggered, or informed to read the broadcast channel or the system information. The indication may be signaled in a paging message or as a direct indication in a DCI for paging. The scheduling information of the downlink burst may be transmitted in a broadcast channel or in system information. A WTRU may receive or attempt to decode the broadcast channel or system information if the WTRU receives a system information update indication.

In an example, an ordered PDSCH transmission may be used for the downlink burst transmission. For example, downlink burst traffic may be split into N_burst transport blocks and may be numbered in an increasing order. Each transport block may be transmitted in a PDSCH transmission. Scheduling information for the downlink burst transmission may indicate the number of transport blocks, represented by, for example N_burst, for the downlink burst transmission. Scheduling information for a PDSCH carrying one or more downlink burst transport blocks may indicate the ordering number of the PDSCH.

Each transport block may be transmitted in a certain time and/or frequency resource. A transport block with a certain transport block number may be associated with a certain subframe number, a certain SFN and/or a certain hyper frame number. Therefore, a WTRU may determine, assume, or understand which transport block may be transmitted in a certain time/frequency resource for the burst transmission. If a WTRU fails to receive a subset of the transport blocks of the N_burst transport blocks, the WTRU may receive the failed transport blocks in a next downlink burst transmission. A transport block with a certain transport block number may be associated with a certain frequency resource. The certain time/frequency resources may be configured via higher layer signaling.

Each PDSCH carrying a transport block may be transmitted with a repetition, where the repetition number may be indicated in the scheduling information. The repetition number may include a value of "1" as a no repetition case.

In an example, a WTRU that fails to receive one or more PDSCH transmissions for a downlink burst transmission may perform one or more of following actions. The WTRU may attempt to receive the failed PDSCH transmission in a following transmission or a following transmission window. A maximum number of attempts may be predefined or configured by higher layers. The maximum number of attempts may include a value of "1".

If the WTRU fails to receive one or more PDSCH transmissions after the maximum number of attempts, the WTRU may attempt to change operation mode, such as, for example, from RRC idle mode to RRC connected mode, and/or the WTRU may initiate a random access or random access channel (RACH) procedure.

In another example, a WTRU that fails to receive one or more PDSCH transmissions for a downlink burst transmission may perform one or more of the following actions. The WTRU may send a corresponding hybrid automatic repeat request acknowledgement (HARQ-ACK) transmission in an associated HARQ-ACK resource. A HARQ transmission for reception failure may be a negative acknowledgement (NACK). A subset of physical random access channel (PRACH) resources may be reserved as an associated HARQ-ACK resource for the downlink burst transmission. For example, a WTRU may send a HARQ transmission that may be a NACK on a PRACH resource when it fails to receive one or more PDSCH transmissions for a downlink burst transmission. A set of physical uplink control channel (PUCCH) resources may be configured, indicated, or used for HARQ transmission, for example for NACK transmission. For example, a WTRU may send a HARQ transmission that may be a NACK on a PUCCH resource that may be configured or indicated when it fails to receive one or more PDSCH transmissions for a downlink burst transmission.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed in a wireless transmit/receive unit (WTRU), the method comprising:
receiving a physical downlink control channel (PDCCH) transmission in a WTRU-specific search space, wherein the PDCCH transmission includes a sequence scrambled based on a first radio network temporary identifier (RNTI), wherein the first RNTI is associated with the WTRU, wherein the sequence includes downlink control information (DCI) and a cyclic redundancy check (CRC);

determining scheduling information for a physical downlink shared channel (PDSCH) transmission based on the DCI; and receiving the PDSCH transmission based on the scheduling information.

2. The method of claim 1, wherein the first RNTI is a WTRU-identifier (WTRU-ID).

3. The method of claim 1, wherein the sequence includes the DCI with the CRC scrambled by a second RNTI.

4. The method of claim 3, wherein the first RNTI is the same as the second RNTI.

5. The method of claim 3, wherein the first RNTI is different from the second RNTI.

6. The method of claim 1, wherein the scrambling of the sequence uses an initialization value based on the first RNTI.

7. The method of claim 1, further comprising:
receiving the first RNTI.

8. The method of claim 1, further comprising:
receiving scrambling indication information indicating that the PDCCH transmission includes information scrambled by an RNTI.

9. The method of claim 8, further comprising:
descrambling the information scrambled by an RNTI based on the receipt of the scrambling indication information.

10. A wireless transmit/receive unit (WTRU) comprising:
a processor; and
a transceiver operatively coupled to the processor; wherein:
the transceiver is configured to receive a physical downlink control channel (PDCCH) transmission in a WTRU-specific search space, wherein the PDCCH transmission includes a sequence scrambled based on a first radio network temporary identifier (RNTI), wherein the first RNTI is associated with the WTRU, wherein the sequence includes downlink control information (DCI) and a cyclic redundancy check (CRC);
the processor is configured to determine scheduling information for a physical downlink shared channel (PDSCH) transmission based on the DCI; and
the transceiver is configured to receive the PDSCH transmission based on the scheduling information.

11. The WTRU of claim 10, wherein the first RNTI is a WTRU-identifier (WTRU-ID).

12. The WTRU of claim 10, wherein the sequence includes the DCI with the CRC scrambled by a second RNTI.

13. The WTRU of claim 12, wherein the first RNTI is the same as the second RNTI.

14. The WTRU of claim 12, wherein the first RNTI is different from the second RNTI.

15. The WTRU of claim 10, wherein the scrambling of the sequence uses an initialization value based on the first RNTI.

16. The WTRU of claim 10, further comprising:
the transceiver further configured to receive the first RNTI.

17. The WTRU of claim 10, wherein the transceiver is further configured to receive scrambling indication information indicating that the PDCCH transmission includes information scrambled by an RNTI.

18. The WTRU of claim 17, wherein the processor is further configured to descramble the information scrambled by an RNTI based on the receipt of the scrambling indication information.

19. A base station comprising:
a processor; and
a transceiver operatively coupled to the processor; wherein:
the processor is configured to determine a first radio network temporary identifier (RNTI), wherein the first RNTI is associated with a wireless transmit/receive unit (WTRU);
the processor is configured to scramble a sequence based on the first RNTI, wherein the sequence includes downlink control information (DCI) and a cyclic redundancy check (CRC);
the processor and the transceiver are configured to transmit a physical downlink control channel (PDCCH) transmission in a WTRU-specific search space to the WTRU, wherein the PDCCH transmission includes the sequence;
the processor is configured to determine scheduling information for a physical downlink shared channel (PDSCH) transmission based on the DCI; and
the processor and the transceiver are configured to transmit the PDSCH transmission based on the scheduling information to the WTRU.

20. The base station of claim 19, further comprising:
the transceiver and the processor are further configured to transmit scrambling indication information indicating that the PDCCH transmission includes information scrambled by an RNTI; wherein the first RNTI is a WTRU-identifier (WTRU-ID); and wherein the sequence includes the DCI with the CRC scrambled by a second RNTI.

* * * * *